US008889757B2

(12) United States Patent
Muratoglu et al.

(10) Patent No.: US 8,889,757 B2
(45) Date of Patent: Nov. 18, 2014

(54) OXIDATION RESISTANT HOMOGENIZED POLYMERIC MATERIAL

(71) Applicant: The General Hospital Corporation, Boston, MA (US)

(72) Inventors: Orhun K. Muratoglu, Cambridge, MA (US); Ebru Oral, Newton, MA (US)

(73) Assignee: The General Hospital Corporation, Boston, MA (US)

( * ) Notice: Subject to any disclaimer, the term of this patent is extended or adjusted under 35 U.S.C. 154(b) by 0 days.

(21) Appl. No.: 13/799,247

(22) Filed: Mar. 13, 2013

(65) Prior Publication Data
US 2013/0203885 A1   Aug. 8, 2013

Related U.S. Application Data

(63) Continuation of application No. 11/465,544, filed on Aug. 18, 2006, now Pat. No. 8,461,225.

(60) Provisional application No. 60/709,795, filed on Aug. 22, 2005.

(51) Int. Cl.
| G03G 9/097 | (2006.01) |
| B41M 7/00 | (2006.01) |
| B29C 71/04 | (2006.01) |
| C08F 2/46 | (2006.01) |
| A61L 2/08 | (2006.01) |
| A61L 24/00 | (2006.01) |
| C08G 61/04 | (2006.01) |
| C08J 3/28 | (2006.01) |
| C08J 5/00 | (2006.01) |

(52) U.S. Cl.
CPC ............. C08J 5/00 (2013.01); *C08J 2300/00* (2013.01); *C08J 3/28* (2013.01); *C08J 2323/00* (2013.01)
USPC ...... 522/75; 522/74; 522/71; 522/1; 522/189; 522/184; 520/1

(58) Field of Classification Search
CPC ......... C08L 77/00; C08L 67/00; C08L 23/06; C08L 2205/03; G03F 7/027; A61L 2/08; A61F 2/30; A61F 2/34; A61F 2/38
USPC ................. 522/75, 74, 71, 1, 189, 184; 520/1
See application file for complete search history.

(56) References Cited

U.S. PATENT DOCUMENTS

| 5,414,049 A | 5/1995 | Sun et al. |
| 5,827,904 A | 10/1998 | Hahn |
| 5,879,400 A | 3/1999 | Merrill et al. |
| 6,448,315 B1 * | 9/2002 | Lidgren et al. ............... 524/110 |
| 6,641,617 B1 | 11/2003 | Merrill et al. |
| 6,765,030 B2 | 7/2004 | DeSimone et al. |
| 6,932,930 B2 | 8/2005 | DeSimone et al. |
| 7,431,874 B2 | 10/2008 | Muratoglu et al. |
| 8,461,225 B2 | 6/2013 | Muratoglu et al. |
| 2003/0212161 A1 * | 11/2003 | McKellop et al. ................. 522/3 |
| 2004/0156879 A1 * | 8/2004 | Muratoglu et al. ........... 424/423 |
| 2004/0209762 A1 | 10/2004 | Takaoki et al. |
| 2004/0266902 A1 | 12/2004 | Shen et al. |
| 2005/0043431 A1 | 2/2005 | Wang et al. |
| 2005/0096749 A1 | 5/2005 | Marrill et al. |
| 2008/0214692 A1 | 9/2008 | Muratoglu et al. |

FOREIGN PATENT DOCUMENTS

| CA | 2502233 | 5/2004 |
| EP | 0995450 | 4/2000 |
| WO | WO 97/29793 | 8/1997 |
| WO | WO 01/05337 | 1/2001 |
| WO | WO 01/80778 | 11/2001 |
| WO | WO 02/26464 | 4/2002 |
| WO | WO 2004/064618 | 8/2004 |
| WO | WO 2005/110276 | 11/2005 |

OTHER PUBLICATIONS

McKellop et al., Journal of Orthopaedic Research 17: 157-167 (1999).
Mori et al., Mechanical Behavior of UHMWPE when Mixed with Vitamin E, $47^{th}$ Annual Meeing, Orthopaedic Research Society, San Francisco, CA (Feb. 25, 2001-Feb. 28, 2001).
Muratoglu et al., Biomaterials 25: 5515-5522 (2004).
Muratoglu et al., Two Second Generation Highly Crosslinked UHMWPES Show Improved Mechanical Properties and Fatigue Strength, $51^{st}$ Annual Meeting of the Orthopaedic Research Society (Poster No. 1661).
Muratoglu et al., Biomaterials 20: 1463-1470 (1999).
Muratoglu et al., The Journal of Arthroplasty 16(2): 149-160 (2001).
Oral et al., The Effect of Doping Conditions on α-Tocopherol Stabilized Irradiated UHMWPE, $51^{st}$ Annual Meeting of the Orthopaedic Research Society (Poster No. 1673.
Oral et al., Biomaterials 26: 6657-6663 (2005).
Oral et al., Biomaterials 27: 5580-5587 (2006).
Oral et al., The Journal of Arthroplasty 21(4): 580-591 (2006).
Oral et al., A Second Generation Highly Crosslinked UHMWPE: Vitamin-E Stabilization Does Not Adversely Affect the Wear of Irradiated Acetabular Liners, $51^{st}$ Annual Meeting of the Orthopaedic Research Society (Poster No. 1712).
Parth et al., Journal of Materials Science: Material in Medicine 13: 917-921 (2002).

* cited by examiner

Primary Examiner — Ling Choi
Assistant Examiner — Jessica E Whiteley
(74) Attorney, Agent, or Firm — Perkins Coie LLP

(57) ABSTRACT

The present invention relates to methods for making oxidation resistant homogenized polymeric materials and medical implants that comprise polymeric materials, for example, ultra-high molecular weight polyethylene (UHMWPE). The invention also provides methods of making antioxidant-doped medical implants, for example, doping of medical devices containing cross-linked UHMWPE with vitamin E by diffusion and annealing the anti-oxidant doped UHMWPE in a super critical fluid, and materials used therein.

19 Claims, 5 Drawing Sheets

OXIDATION RESISTANT HOMOGENIZED POLYMERIC MATERIAL

This application is a continuation of Ser. No. 11/465,544 filed Aug. 18, 2006, which claims priority to U.S. Application No. 60/709,795 filed Aug. 22, 2005, the entireties of which are hereby incorporated by reference.

This invention was made with Government support under Grant No. AR051142 awarded by the National Institutes of Health. The Government has certain rights in this invention.

FIELD OF THE INVENTION

The present invention relates to methods for making oxidation resistant homogenized polymeric materials and medical implants that comprise the material. Methods of doping polyethylene with an additive, for example, vitamin E, and annealing the additive-doped polyethylene in a super critical fluid, for example, $CO_2$, and materials used therewith also are provided.

BACKGROUND OF THE INVENTION

First generation highly cross-linked ultra-high molecular weight polyethylenes (UHMWPE) are generally irradiated and melted to reduce the adhesive/abrasive wear of UHMWPE components in total joint arthroplasty (see Muratoglu et al., *J Arthroplasty*, 2001. 16(2): p. 149-160; Muratoglu et al., *Biomaterials*, 1999. 20(16): p. 1463-1470; and McKellop et al., *J Orthop Res*, 1999. 17(2): p. 157-167). The post-irradiation melting step, used to impart oxidation resistance to irradiated UHMWPE, generally reduces the fatigue strength of irradiated polyethylene by about 20% (see Oral et al., *Biomaterials*, 2004. 25: p. 5515-5522).

It is generally known that mixing of polyethylene powder with an antioxidant prior to consolidation may improve the oxidation resistance of the polyethylene material. Antioxidants, such as vitamin E and β-carotene, have been mixed with UHMWPE powder or particles by several investigators (see, Mori et al. p. 1017, *Hand-out at the 47th Annual Meeting, Orthopaedic Res Soc*, Feb. 25-28, 2001, San Francisco, Calif.; McKellop et al. WO 01/80778; Schaffner et al. EP 0 995 450; Hahn D. U.S. Pat. No. 5,827,904; Lidgren et al. U.S. Pat. No. 6,448,315), in attempts to improve wear resistance. Mori et al. also described that irradiation does not decrease the oxidation resistance of antioxidant-doped polyethylene. The investigators (see, McKellop et al. WO 01/80778; Schaffner et al. EP 0 995 450; Hahn D. U.S. Pat. No. 5,827,904; Lidgren et al. U.S. Pat. No. 6,448,315) described mixing polyethylene powder with antioxidants, followed by consolidating the antioxidant-powder mix to obtain oxidation resistant polyethylene. Mixing of the resin powder, flakes, or particles with vitamin E and consolidation thereafter result in changes in color of polymeric material to yellow (see for example, U.S. Pat. No. 6,448,315). In addition, the addition of the antioxidant to the UHMWPE prior to irradiation can inhibit crosslinking of the UHMWPE during irradiation (Parth et al., *J Mater Sci-Mater Med*, 2002. 13(10): p. 917-921; Oral et al., *Biomaterials*, 2005. 26: p. 6657-6663). However, crosslinking is needed to increase the wear resistance of the polymer.

Vitamin E-stabilized highly cross-linked UHMWPE is a next generation highly cross-linked UHMWPE and has been developed (see Oral et al., *Biomaterials*, 2004. 25: p. 5515-5522; Muratoglu et al., *Transactions of the Orthopaedic Research Society*, 2005. 1661; Oral et al., *Transactions of the Orthopaedic Research Society*, 2005. 1171, Oral et al., *J Arthroplasty*, 2005. in print) to decrease the extent of mechanical and fatigue strength degradation seen in first generation irradiated and melted highly cross-linked UHMWPEs. Melting in combination with irradiation creates cross-links and facilitates recombination of the residual free radicals trapped mostly in the crystalline regions, which otherwise would cause oxidative embrittlement upon reactions with oxygen. However, cross-linking and the decrease in the crystallinity accompanying post-irradiation melting are thought to be the reasons for the decrease in fatigue strength, yield strength, ultimate tensile strength, toughness and elongation at break of radiation cross-linked and melted UHMWPE. It is, therefore, desirable to reduce the irradiation-created residual free radical concentration in cross-linked UHMWPE without reducing crystallinity, so as to achieve high fatigue resistance for high stress application that require low wear.

An antioxidant can be used to interact with the free radicals induced by irradiation and prevent them from reacting with other chains to further the oxidation cascade. This eliminates the need for post-irradiation melting of radiation cross-linked UHMWPE and avoids the decrease in crystallinity and strength accompanying post-irradiation melting. Vitamin-E (α-tocopherol) is such an antioxidant and protects irradiated UHMWPE against oxidation. However, for a long-term oxidative stability of an irradiated implant, vitamin E must be present throughout the component at all times.

Previously, high temperature doping with subsequent high temperature homogenization at ambient pressure was used to enhance α-tocopherol diffusion in irradiated UHMWPE (see Muratoglu et al., U.S. application Ser. No. 10/757,551, filed Jan. 15, 2004; and Oral et al., *Transactions of the Orthopaedic Research Society*, 2005, 1673). This method is suitable for doping of finished components. However, the duration of doping and homogenization increases considerably with increasing component thickness. Therefore, it would be desirable to accelerate the rate of α-tocopherol diffusion in irradiated UHMWPE, which was not possible with prior art practices. This invention would also allow the incorporation of antioxidants into bar stock efficiently, from which medical implants can be machined.

SUMMARY OF THE INVENTION

The present invention relates generally to methods of making oxidation resistant medical devices that comprises one or more homogenized polymeric materials. More specifically, the invention relates to methods of manufacturing antioxidant doped medical devices containing cross-linked homogenized polyethylene, for example, cross-linked ultra-high molecular weight polyethylene (UHMWPE), and materials used therein. More specifically, the invention relates to methods of manufacturing an additive-doped such as antioxidant-doped and homogenized by doping in a super critical fluid, non-oxidizing medical device containing cross-linked polyethylene with residual free radicals, for example, irradiated ultra-high molecular weight polyethylene (UHMWPE) and materials used therein.

One aspect of the invention provides methods of making an antioxidant-doped homogenized cross-linked polymeric material comprising: a) irradiating the polymeric material at temperature below the melt with ionizing radiation; thereby forming a cross-linked polymeric material; b) doping the cross-linked polymeric material with an additive such as antioxidant at ambient pressure; and c) annealing the additive-doped (such as antioxidant-doped), cross-linked polymeric material at a temperature below the melt in a supercritical fluid; thereby forming an additive-doped (such as antioxidant-doped) homogenized cross-linked polymeric material.

Another aspect of the invention provides methods of making an antioxidant-doped homogenized cross-linked polymeric material comprising: a) doping the polymeric material with an antioxidant at ambient pressure; b) annealing the antioxidant-doped polymeric material at a temperature below the melt in a supercritical fluid; thereby forming an antioxidant-doped homogenized polymeric material; and c) irradiating the polymeric material at a temperature below the melt with ionizing radiation; thereby forming a antioxidant-doped homogenized cross-linked polymeric material.

Another aspect of the invention provides methods of making a medical implant comprising: a) providing a polymeric material; b) consolidating the polymeric material; c) irradiating the consolidated polymeric material with ionizing radiation, thereby forming a consolidated and cross-linked polymeric material; d) machining the consolidated and cross-linked polymeric material, thereby forming a medical implant; e) doping the medical implant with an antioxidant by diffusion, thereby forming an antioxidant-doped cross-linked medical implant; and f) annealing the antioxidant-doped cross-linked medical implant at a temperature below the melt in a supercritical fluid; thereby forming an antioxidant-doped homogenized cross-linked medical implant.

Another aspect of the invention provides methods of making a medical implant comprising: a) providing a polymeric material; b) consolidating the polymeric material; c) machining the consolidated polymeric material, thereby forming a medical implant; d) irradiating the medical implant with ionizing radiation, thereby forming a cross-linked medical implant; e) doping the medical implant with an antioxidant by diffusion, thereby forming an antioxidant-doped cross-linked medical implant; and f) annealing the antioxidant-doped cross-linked medical implant at a temperature below the melt in a supercritical fluid; thereby forming an antioxidant-doped homogenized cross-linked medical implant.

Another aspect of the invention provides methods of making a medical implant comprising: a) providing a polymeric material; b) consolidating the polymeric material; c) irradiating the polymeric material with ionizing radiation, thereby forming a cross-linked polymeric material; e) doping the polymeric material with an antioxidant by diffusion, thereby forming an antioxidant-doped cross-linked polymeric material; f) annealing the antioxidant-doped cross-linked polymeric material at a temperature below the melt in a supercritical fluid; thereby forming an antioxidant-doped homogenized cross-linked polymeric material; g) machining the antioxidant-doped homogenized cross-linked polymeric material, thereby forming an antioxidant-doped homogenized cross-linked medical implant.

Another aspect of the invention provides methods of making a medical implant comprising: a) providing a polymeric material; b) consolidating the polymeric material; c) doping the consolidated polymeric material with an antioxidant by diffusion; d) annealing the antioxidant-doped polymeric material at a temperature below the melt in a supercritical fluid; thereby forming an antioxidant-doped homogenized polymeric material; e) machining the antioxidant doped polymeric material, thereby forming an antioxidant doped polymeric material; and f) irradiating the antioxidant doped cross-linked polymeric material by ionizing radiation, thereby forming an antioxidant-doped cross-linked medical implant.

Another aspect of the invention provides methods of making a medical implant comprising: a) providing a polymeric material; b) consolidating the polymeric material; c) doping the consolidated polymeric material with an antioxidant by diffusion; d) annealing the antioxidant-doped polymeric material at a temperature below the melt in a supercritical fluid; thereby forming an antioxidant-doped homogenized polymeric material; e) irradiating the antioxidant-doped polymeric material by ionizing radiation, thereby forming an antioxidant doped cross-linked polymeric material; and f) machining the cross-linked polymeric material, thereby forming an antioxidant doped cross-linked medical implant.

Another aspect of the invention provides methods of making a medical implant comprising: a) providing a polymeric material; b) consolidating the polymeric material; c) machining the consolidated polymeric material, thereby forming a medical implant; d) doping the medical implant with an antioxidant by diffusion, thereby forming an antioxidant doped medical implant; e) annealing the antioxidant-doped medical implant at a temperature below the melt in a supercritical fluid; thereby forming an antioxidant-doped homogenized medical implant; f) packaging the medical implant; and g) irradiating the packaged medical implant by ionizing radiation, thereby forming an antioxidant doped cross-linked and sterile medical implant.

Another aspect of the invention provides methods of making a medical implant comprising: a) providing a polymeric material; b) consolidating the polymeric material, c) machining the consolidated polymeric material, thereby forming a medical implant; d) doping the medical implant with an antioxidant by diffusion, thereby forming an antioxidant doped medical implant; e) annealing the antioxidant-doped medical implant at a temperature below the melt in a supercritical fluid; thereby forming an antioxidant-doped homogenized medical implant; f) packaging the medical implant; and f) irradiating the packaged medical implant by ionizing radiation, thereby forming an antioxidant doped cross-linked and sterile medical implant.

Another aspect of the invention provides methods of making a medical implant comprising: a) providing a polymeric material; b) consolidating the polymeric material, c) machining the consolidated polymeric material, thereby forming a medical implant; d) irradiating the medical implant by ionizing radiation, thereby forming a cross-linked medical implant; e) doping the cross-linked medical implant with an antioxidant by diffusion, thereby forming an antioxidant doped cross-linked medical implant; e) annealing the antioxidant-doped cross-linked medical implant at a temperature below the melt in a supercritical fluid; thereby forming an antioxidant-doped homogenized cross-linked medical implant.

Another aspect of the invention provides methods of making a medical implant comprising: a) providing a polymeric material; b) compression molding the polymeric material, thereby forming a medical implant; c) doping the medical implant with an antioxidant by diffusion, thereby forming an antioxidant doped medical implant; d) annealing the antioxidant-doped medical implant at a temperature below the melt in a supercritical fluid; thereby forming an antioxidant-doped homogenized medical implant; e) packaging the medical implant; and f) irradiating the packaged medical implant by ionizing radiation, thereby forming an antioxidant doped cross-linked and sterile medical implant.

Another aspect of the invention provides methods of making a medical implant comprising: a) providing a consolidated polymeric material; b) irradiating the consolidated polymeric material with ionizing radiation, thereby forming a consolidated and cross-linked polymeric material; c) machining the consolidated and cross-linked polymeric material, thereby forming a medical implant; d) doping the medical implant with an antioxidant by diffusion, thereby forming an antioxidant-doped cross-linked medical implant; and e) annealing the antioxidant-doped cross-linked medical implant at a temperature below the melt in a supercritical fluid; thereby forming an antioxidant-doped cross-linked homogenized medical implant.

Another aspect of the invention provides homogenized polymeric materials containing detectable residual free radicals, wherein the polymeric material is non-oxidizing and cross-linked.

Another aspect of the invention provides methods medical implants comprising non-oxidizing cross-linked homogenized polymeric material containing detectable residual free radicals.

Yet in another aspect, the invention provides methods of making a medical implant containing cross-linked antioxidant-doped homogenized polymeric material, wherein the implant comprises medical devices, including acetabular liner, shoulder glenoid, patellar component, finger joint component, ankle joint component, elbow joint component, wrist joint component, toe joint component, bipolar hip replacements, tibial knee insert, tibial knee inserts with reinforcing metallic and polyethylene posts, intervertebral discs, heart valves, tendons, stents, and vascular grafts, wherein the polymeric material is polymeric resin powder, polymeric flakes, polymeric particles, or the like, or a mixture thereof.

Yet in another aspect, the invention provides methods of making medical implants, including non-permanent implants, containing cross-linked antioxidant-doped homogenized polymeric material, wherein the implant comprises medical device, including balloon catheters, sutures, tubing, and intravenous tubing, wherein the polymeric material is polymeric resin powder, polymeric flakes, polymeric particles, or the like, or a mixture thereof. As described herein, the polymeric balloons, for example, polyether-block co-polyamide polymer (PeBAX®), Nylon, and polyethylene terephthalate (PET) balloons are doped with vitamin E and irradiated before, during, or after doping.

Yet in another aspect, the invention provides methods of making a packaging for a medical device, wherein the packaging is resistant to oxidation when subjected to sterilization with ionizing radiation or gas sterilization. The packaging include barrier materials, for example, blow-molded blister packs, heat-shrinkable packaging, thermally-sealed packaging, or the like or a mixture thereof.

In one aspect, antioxidant-doped medical implants are packaged and sterilized by ionizing radiation or gas sterilization to obtain sterile and cross-linked medical implants.

In another aspect, the polymeric material of the instant invention is a polymeric resin powder, polymeric flakes, polymeric particles, or the like, or a mixture thereof, wherein the irradiation can be carried out in an atmosphere containing between about 1% and about 22% oxygen, wherein the radiation dose is between about 25 kGy and about 1000 kGy.

In another aspect, the polymeric material of the instant invention is polymeric resin powder, polymeric flakes, polymeric particles, or the like, or a mixture thereof, wherein the polymeric material is irradiated after consolidation in an inert atmosphere containing a gas, for example, nitrogen, argon, helium, neon, or the like, or a combination thereof, wherein the radiation dose is between about 25 kGy and about 1000 kGy.

In another aspect, the polymeric material of the instant invention is consolidated polymeric material, where the consolidation can be carried out by compression molding to form a slab from which a medical device is machined.

In another aspect, the polymeric material of the instant invention is consolidated polymeric material, where the consolidation can be carried out by direct compression molding to form a finished medical device.

Yet in another aspect, the polymeric material of the instant invention is consolidated polymeric material, where the consolidation can be carried out by compression molding to another piece to form an interface and an interlocked hybrid material.

According to another aspect of the invention, doping can also be done in inert, air or supercritical at low or high pressure before annealing in supercritical.

Another aspect of the invention provides methods to increase the penetration of antioxidant and the homogeneity or the uniformity of an antioxidant in a doped polymeric material by annealing the doped polymeric material below the melting point of the doped polymeric material in a super critical fluid, for example, $CO_2$.

Another aspect of the invention provides methods to increase the penetration of antioxidant and the homogeneity or the uniformity an antioxidant in a doped polymeric material by annealing the doped polymeric material above the melting point of the doped polymeric material in a super critical fluid, for example, $CO_2$.

Another aspect of the invention provides methods of making oxidation-resistant highly crystalline, cross-linked polymeric material by high pressure crystallization comprising: a) heating a polymeric material at temperature above the melt; b) pressurizing the highly crystalline cross-linked polymeric material under at least about 10-1000 MPa; c) holding at this pressure; d) cooling the heated polymeric material to below the melting point of the polymer at ambient pressure or to about room temperature; e) releasing the pressure to an atmospheric pressure level; f) doping the polymeric material with an antioxidant by diffusion, thereby forming an antioxidant-doped polymeric material; g) irradiating the antioxidant-doped polymeric material at temperature below the melt with ionizing radiation, thereby forming an antioxidant-doped highly crystalline cross-linked polymeric material; and h) annealing the antioxidant-doped highly crystalline cross-linked polymeric material at a temperature below the melt in a supercritical fluid; thereby forming an antioxidant-doped homogenized cross-linked polymeric material.

Another aspect of the invention provides methods of making oxidation-resistant highly crystalline, cross-linked polymeric material by high pressure crystallization comprising: a) pressurizing a polymeric material under at least above 10-1000 MPa; b) heating the pressurized polymeric material at temperature below the melt of the pressurized polymeric material; c) holding at this pressure and temperature; d) cooling the heated polymeric material to below the melting point of the polymer at ambient pressure or to about room temperature; e) releasing the pressure to an atmospheric pressure level; f) doping the highly crystalline polymeric material with an antioxidant by diffusion, thereby forming an antioxidant-doped highly crystalline polymeric material; g) irradiating the antioxidant-doped polymeric material at temperature below the melt with ionizing radiation, thereby forming an antioxidant-doped highly crystalline cross-linked polymeric material; and h) annealing the antioxidant-doped highly crystalline cross-linked polymeric material at a temperature below the melt in a supercritical fluid; thereby forming an antioxidant-doped homogenized cross-linked polymeric material.

DETAILED DESCRIPTION OF THE INVENTION

Figure 1:
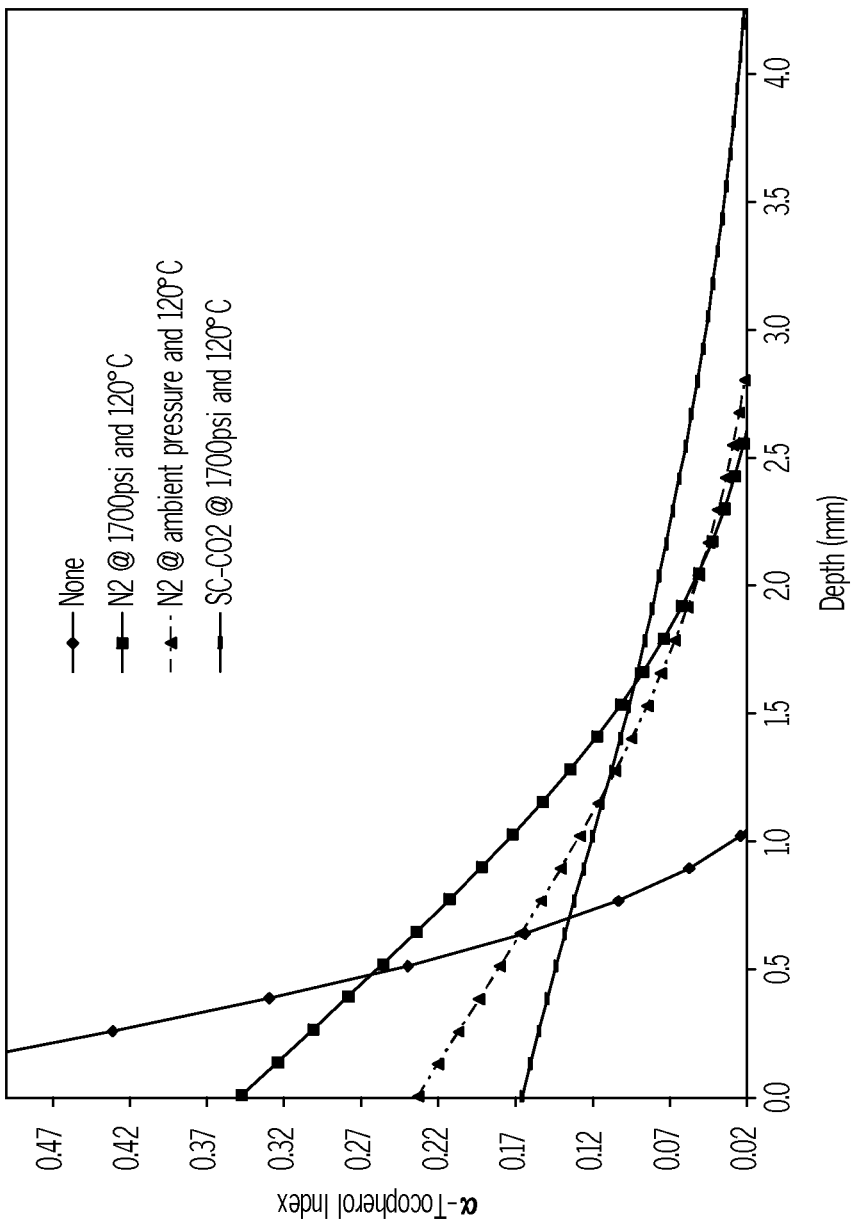
FIG. 1 shows α-Tocopherol index profiles of 100-kGy irradiated UHMWPE samples doped in argon with α-tocopherol for 16 hours at 120° C. followed by various homogenization conditions.

The present invention provides methods of making oxidation resistant medical implants that comprise medical devices, including permanent and non-permanent devices, and packaging that comprises cross-linked homogenized polymeric material, such as cross-linked homogenized polyethylene. The invention pertains to methods of doping consolidated polyethylene, such as UHMWPE, with antioxidants, before, during, or after crosslinking the consolidated polyethylene, and followed by annealing the antioxidant-doped polyethylene in a super critical fluid.

The invention provides methods for using supercritical carbon dioxide ($SC$-$CO_2$) in post-doping annealing for homogenization of polymeric materials. According to the invention, post-doping annealing in $SC$-$CO_2$ enhanced α-tocopherol penetration in polymeric materials compared to inert gas due to the ability of $SC$-$CO_2$ to swell the polymeric materials, thus enhance the rate of α-tocopherol diffusion.

Post-doping annealing of polymeric materials in $SC$-$CO_2$ can also be applied to highly crystalline polymeric materials as disclosed in Muratoglu et al., U.S. application Ser. No. 10/757,551, filed Jan. 15, 2004, the entireties of which, more specifically the methods of making highly crystalline polymeric materials, are incorporated herein.

In one aspect of the invention, the doping of consolidated polyethylene can be carried out by diffusion of an antioxidant, for example, α-tocopherol, such as vitamin E. According to one aspect of the invention, the diffusion of the antioxidant is accelerated by increasing the temperature and/or pressure or by using a supercritical fluid, such as $CO_2$ and subsequent annealing in a super critical fluid.

According to another aspect of the invention, an antioxidant is delivered in various forms, including in a pure form, for example, as pure vitamin E, or dissolved in a solvent.

According to another aspect of the invention, diffusion rate of an antioxidant into the polyethylene is increased by increasing the concentration of the antioxidant solution, for example, a vitamin E solution.

In accordance with another aspect of the invention, diffusion rate of an antioxidant into the polyethylene is increased by swelling the consolidated polyethylene in a supercritical fluid, for example, in a supercritical $CO_2$, i.e., the temperature being above the supercritical temperature, which is 31.3° C., and the pressure being above the supercritical pressure, which is 73.8 bar.

The solubility of vitamin E can be changed in supercritical carbon dioxide by the addition of a third component such as an alcohol or a surfactant such as Tween 80. In one aspect of the invention, a third component is added into the chamber to be solubilized during heating and pressurization or is pumped together or separately with the supercritical fluid (or fluids) into the annealing environment.

Heating and pressurization into the supercritical phase during annealing can be done in several ways. In one embodiment of the invention, the samples are heated to the desired temperature, then they are pressurized in a supercritical fluid or mixtures of supercritical fluids. Alternatively, liquid carbon dioxide is charged into the pressurization environment, subsequently, the samples are heated to the desired temperature at the same time raising the pressure of the environment. Heating and cooling is done at a rate of about 0.01° C. to about 500° C./min, preferable at about 0.1° C./min to 10° C./min, more preferably about 1° C./min. Pressurization is done at about 0.01 psi/min to about 20000 psi/min, preferably about 1 psi/min to 50 psi/min, more preferably about 10 psi/min. Depressurization is done at about 0.01 psi/min to about 20000 psi/min, preferably about 1 psi/min to 50 psi/min, more preferably about 50 psi/min.

In another embodiment, the samples are maintained in the supercritical phase at one temperature and pressure, then at another temperature and/or pressure during the course of annealing.

In general, for example, in case of vitamin E, as the antioxidant, mixing the resin powder, flakes, particles, or a mixture thereof, with vitamin E and consolidation thereafter result in changes in color of polymeric material to yellow. According to the instant invention, doping subsequent to consolidation avoids the exposure of vitamin E to high temperatures and pressures of consolidation and prevents the discoloration of the polymeric material. The invention also decreases the thermal effects on the antioxidant. The thermal effects can reduce the effectiveness of the antioxidant in protecting the polymeric material against oxidation.

Doping in the consolidated state also allows one to achieve a gradient of antioxidant in consolidated polymeric material. One can dope a certain thickness surface layer where the oxidation of the polymeric material in a medical device is of concern in terms of wear. This can be achieved by dipping or soaking finished devices, for example, a finished medical implant, for example, in pure vitamin E or in a solution of vitamin E at a given temperature and for a given amount of time.

Figure 2:
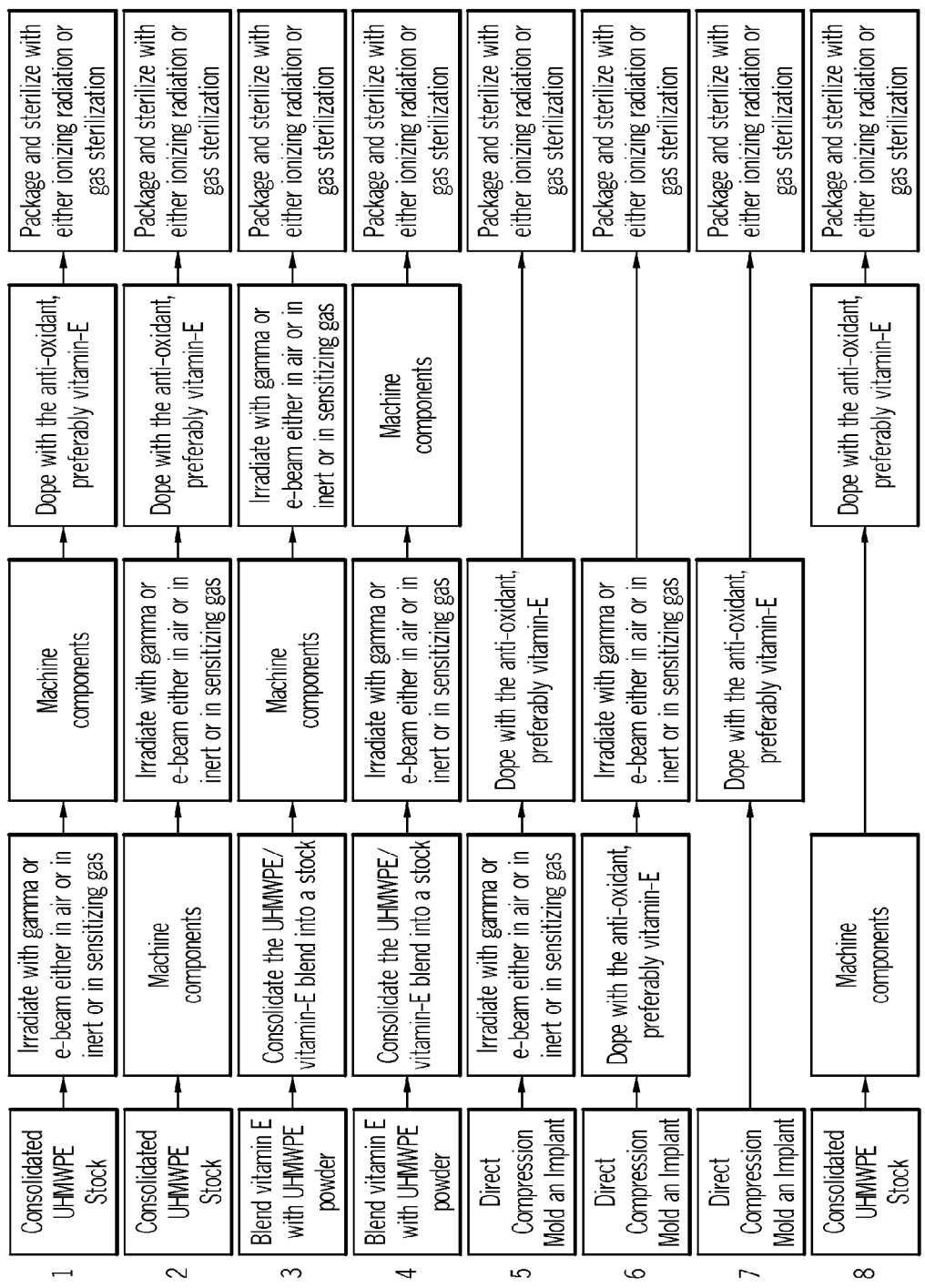
FIG. 2 schematically shows examples of sequences of processing UHMWPE and doping at various steps.
Figure 3:
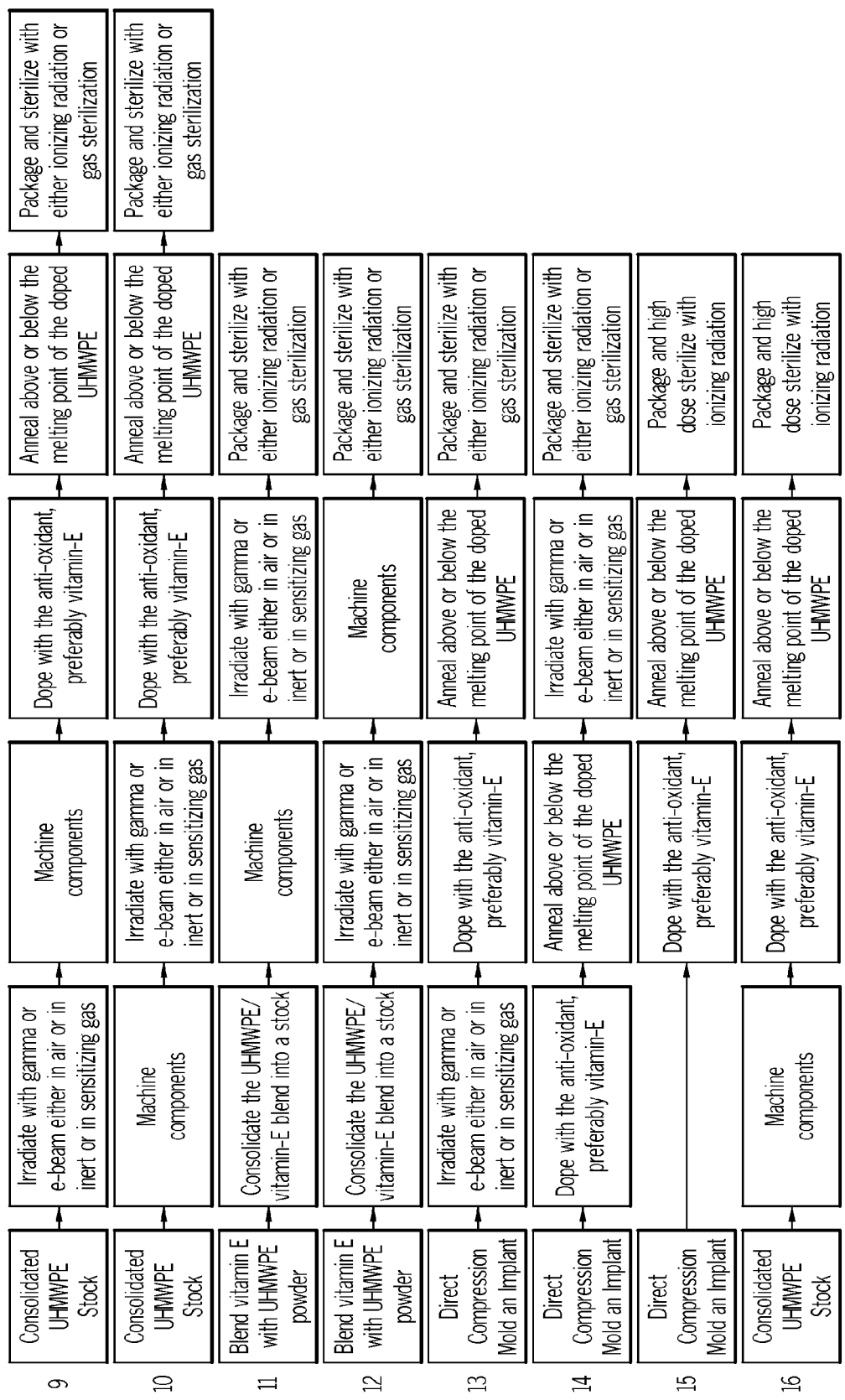
FIG. 3 schematically shows examples of sequences of processing UHMWPE and doping at various steps.

According to the methods described herein, an antioxidant, for example, vitamin E, can be doped into the polymeric material either before, during, or after irradiation (See for example, FIGS. 2 and 3). The methods further comprise a step of annealing in a supercritical fluid. For example, the antioxidant-doped cross-linked or not cross-linked polymeric material at a temperature below the melt in a supercritical fluid, for example, Super critical $CO_2$.

It may be possible that the doped antioxidant can leach out of the polymeric material used in fabrication of medical implants or medical devices either during storage prior to use or during in vivo service. For a permanent medical device, the in vivo duration can be as long as the remaining life of the patient, which is the length of time between implantation of the device and the death of the patient, for example, 1-120 years. If leaching out of the antioxidant is an issue, the irradiation of the medical implant or medical device or irradiation of any portion thereof can be carried out after doping the antioxidant. This can ensure crosslinking of the antioxidant to the host polymer through covalent bonds and thereby prevent loss of antioxidant from the medical implant or the device.

According to another aspect of the invention, polymeric material, for example, resin powder, flakes, particles, or a mixture thereof, is blended or doped with an antioxidant and then the mixture is consolidated. The consolidated antioxidant-blended or antioxidant-doped polymeric material can be machined to use as a component in a medical implant or as a medical device.

According to another aspect of the invention, the starting material can be a blend of additive and polymeric material. The additive can be an antioxidant and/or its derivatives, and/or a blend of antioxidants and/or their derivatives, one such antioxidant is vitamin E.

According to another aspect of the invention, consolidated polymeric material, for example, consolidated resin powder, molded sheet, blown films, tubes, balloons, flakes, particles, or a mixture thereof, can be doped with an additive such as antioxidant, for example, vitamin E in the form of α-Tocopherol, by diffusion. Consolidated polymeric material, for example, consolidated UHMWPE can be soaked in, for example, 100% vitamin E or in a solution of α-Tocopherol in an alcohol, for example, ethanol or isopropanol. A solution of α-Tocopherol, about 50% by weight in ethanol can be used to diffuse in to UHMWPE in contact with a supercritical fluid, such as $CO_2$. The balloons, for example, PeBAX®, Nylon, and PET balloons can be doped with vitamin E and irradiated before, during, or after doping.

The invention also relates to the following processing steps to fabricate medical devices made out of highly cross-linked polyethylene and containing metallic pieces such as bipolar hip replacements, tibial knee inserts with reinforcing metallic and polyethylene posts, intervertebral disc systems, and for any implant that contains a surface that cannot be readily sterilized by a gas sterilization method.

According to one aspect of the invention, the polyethylene component of a medical implant is in close contact with another material, such as a metallic mesh or back, a non-metallic mesh or back, a tibial tray, a patella tray, or an acetabular shell, wherein the polyethylene, such as resin powder, flakes and particles are directly compression molded to these counter faces. For example, a polyethylene tibial insert is manufactured by compression molding of polyethylene resin powder to a tibial tray, to a metallic mesh or back or to a non-metallic mesh or back. In the latter case, the mesh is shaped to serve as a fixation interface with the bone, through either bony in-growth or the use of an adhesive, such as polymethylmethacrylate (PMMA) bone cement. These shapes are of various forms including, acetabular liner, tibial tray for total or unicompartmental knee implants, patella tray, and glenoid component, ankle, elbow or finger component. Another aspect of the invention relates to mechanical interlocking of the molded polyethylene with the other piece(s), for example, a metallic or a non-metallic piece, that makes up part of the implant.

The interface geometry is crucial in that polyethylene assumes the geometry as its consolidated shape. Polyethylene has a remarkable property of 'shape memory' due to its very high molecular weight that results in a high density of physical entanglements. Following consolidation, plastic deformation introduces a permanent shape change, which attains a preferred high entropy shape when melted. This recovery of the original consolidated shape is due to the 'shape memory', which is achieved when the polyethylene is consolidated.

The recovery of polymeric material when subjected to annealing in an effort to quench residual free radicals is also problematic in medical devices that have a high degree of orientation. Balloon catheters often can have intended axial and radial alignment of the polymeric chains. Balloon catheters made from polyethylene benefit from the improved wear resistance generated from crosslinking when used with stents. Additionally, the use of catheters and stents coated with drugs precludes the use of ethylene oxide sterilization in some cases; thus ionizing radiation must be used, and the balloon catheter has to be protected from the deleterious effects of free-radical induced oxidation. Annealing of these materials close to the melt transition temperature would result in bulk chain motion and subsequent loss of dimensional tolerances of the part. By diffusing 100% vitamin E or in a solution of α-Tocopherol in an alcohol, for example, ethanol or isopropanol, into the medical device, such as a balloon catheter, either before, during, or after exposure to ionizing radiation for either crosslinking or sterilization, the problems associated with post-irradiation oxidation can be avoided without the need for thermal treatment. As described herein, the balloons, for example, PeBAX®, Nylon, and PET balloons can be doped with vitamin E and irradiated before, during, or after doping.

Another aspect of the invention provides that following the compression moldings of the polyethylene to the counterface with the mechanical interlock, the hybrid component is irradiated using ionizing radiation to a desired dose level, for example, about 25 kGy to about 1000 kGy, preferably between about 25 kGy and about 150 kGy, more preferably between about 50 kGy and about 100 kGy. Another aspect of the invention discloses that the irradiation step generates residual free radicals and therefore, a melting step is introduced thereafter to quench the residual free radicals. Since the polyethylene is consolidated into the shape of the interface, thereby setting a 'shape memory' of the polymer, the polyethylene does not separate from the counterface.

In another aspect of the invention, there are provided methods of crosslinking polyethylene, to create a polyethylene-based medical device, wherein the device is immersed in a non-oxidizing medium such as inert gas or inert fluid, wherein the medium is heated to a temperature below the melting point of the irradiated polyethylene, for example, UHMWPE (below about 137° C.) to eliminate some crystalline matter during cross-linking.

In another aspect of the invention, there are provided methods of crosslinking polyethylene, to create a polyethylene-based medical device, wherein the device is immersed in a non-oxidizing medium such as inert gas or inert fluid, wherein the medium is heated to above the melting point of the irradiated polyethylene, for example, UHMWPE (above about 137° C.) to eliminate the crystalline matter and to allow the recombination/elimination of the residual free radicals. Because the shape memory of the compression molded polymer is set at the mechanically interlocked interface and that memory is strengthened by the crosslinking step, there is no significant separation at the interface between the polyethylene and the counterface.

Another aspect of the invention provides that following the above steps of free radical elimination, the interface between the metal and the polymer become sterile due to the high irradiation dose level used during irradiation. When there is substantial oxidation on the outside surface of the polyethylene induced during the free radical elimination step or irradiation step, the device surface can be further machined to remove the oxidized surface layer. In another aspect, the invention provides that in the case of a post-melting machining of an implant, the melting step can be carried out in the presence of an inert gas.

Another aspect of the invention includes methods of sterilization of the fabricated device, wherein the device is further sterilized with ethylene oxide, gas plasma, or the other gases, when the interface is sterile but the rest of the component is not.

In another aspect, the invention discloses packaging of irradiated and antioxidant-doped medical implants or medical devices including compression molded implants or devices, wherein the implants or the devices can be sterilized by ionizing radiation or gas sterilization to obtain sterile and cross-linked medical implants or medical devices.

DEFINITIONS

An "additive" refers to what is known in the art as additional component other than the polymeric material. An "additive" can be, for example, a nucleating agent, an antioxidant, a lipid, a low molecular weight polyethylene.

"Antioxidant" refers to what is known in the art as (see, for example, WO 01/80778, U.S. Pat. No. 6,448,315). Alpha- and delta-tocopherol; propyl, octyl, or dedocyl gallates; lactic, citric, and tartaric acids and their salts; orthophosphates, tocopherol acetate, preferably vitamin E.

"Supercritical fluid" refers to what is known in the art, for example, supercritical propane, acetylene, carbon dioxide ($CO_2$). In this connection the critical temperature is that temperature above which a gas cannot be liquefied by pressure alone. The pressure under which a substance may exist as a gas in equilibrium with the liquid at the critical temperature is the critical pressure. Supercritical fluid condition generally means that the fluid is subjected to such a temperature and such a pressure that a supercritical fluid and thereby a supercritical fluid mixture is obtained, the temperature being above the supercritical temperature, which for $CO_2$ is 31.3° C., and the pressure being above the supercritical pressure, which for $CO_2$ is 73.8 bar. More specifically, supercritical condition refers to a condition of a mixture, for example, UHMWPE with an antioxidant, at an elevated temperature and pressure, when a supercritical fluid mixture is formed and then evaporate $CO_2$ from the mixture, UHMWPE doped with an antioxidant is obtained (see, for example, U.S. Pat. No. 6,448,315 and WO 02/26464).

The term "dissolution agent" refers to a compound which can increase the solubility of an additive such as vitamin E in a solution such as a supercritical fluid or a mixture of supercritical fluids.

The term "compression molding" as referred herein related generally to what is known in the art and specifically relates to high temperature molding polymeric material wherein polymeric material is in any physical state, including powder form, is compressed into a slab form or mold of a medical implant, for example, a tibial insert, an acetabular liner, a glenoid liner, a patella, or an unicompartmental insert, can be machined.

The term "direct compression molding" as referred herein related generally to what is known in the art and specifically relates to molding applicable in polyethylene-based devices, for example, medical implants wherein polyethylene in any physical state, including powder form, is compressed to solid support, for example, a metallic back, metallic mesh, or metal surface containing grooves, undercuts, or cutouts. The compression molding also includes high temperature compression molding of polyethylene at various states, including resin powder, flakes and particles, to make a component of a medical implant, for example, a tibial insert, an acetabular liner, a glenoid liner, a patella, or an unicompartmental insert.

The term "mechanically interlocked" refers generally to interlocking of polyethylene and the counterface, that are produced by various methods, including compression molding, heat and irradiation, thereby forming an interlocking interface, resulting into a 'shape memory' of the interlocked polyethylene. Components of a device having such an interlocking interface can be referred to as a "hybrid material". Medical implants having such a hybrid material, contain a substantially sterile interface.

The term "substantially sterile" refers to a condition of an object, for example, an interface or a hybrid material or a medical implant containing interface(s), wherein the interface is sufficiently sterile to be medically acceptable, i.e., will not cause an infection or require revision surgery.

"Metallic mesh" refers to a porous metallic surface of various pore sizes, for example, 0.1-3 mm. The porous surface can be obtained through several different methods, for example, sintering of metallic powder with a binder that is subsequently removed to leave behind a porous surface; sintering of short metallic fibers of diameter 0.1-3 mm; or sintering of different size metallic meshes on top of each other to provide an open continuous pore structure.

"Bone cement" refers to what is known in the art as an adhesive used in bonding medical devices to bone. Typically, bone cement is made out of polymethylmethacrylate (PMMA).

"High temperature compression molding" refers to the compression molding of polyethylene in any form, for example, resin powder, flakes or particles, to impart new geometry under pressure and temperature. During the high temperature (above the melting point of polyethylene) compression molding, polyethylene is heated to above its melting point, pressurized into a mold of desired shape and allowed to cool down under pressure to maintain a desired shape.

"Shape memory" refers to what is known in the art as the property of polyethylene, for example, an UHMWPE, that attains a preferred high entropy shape when melted. The preferred high entropy shape is achieved when the resin powder is consolidated through compression molding.

The phrase "substantially no detectable residual free radicals" refers to a state of a polyethylene component, wherein enough free radicals are eliminated to avoid oxidative degradation, which can be evaluated by electron spin resonance (ESR). The phrase "detectable residual free radicals" refers to the lowest level of free radicals detectable by ESR or more. The lowest level of free radicals detectable with current state-of-the-art instruments is about $10^{14}$ spins/gram and thus the term "detectable" refers to a detection limit of $10^{14}$ spins/gram by ESR.

The terms "about" or "approximately" in the context of numerical values and ranges refers to values or ranges that approximate or are close to the recited values or ranges such that the invention can perform as intended, such as having a desired degree of crosslinking and/or a desired lack of free radicals, as is apparent to the skilled person from the teachings contained herein. This is due, at least in part, to the varying properties of polymer compositions. Thus these terms encompass values beyond those resulting from systematic error.

Polymeric Material:

Ultra-high molecular weight polyethylene (UHMWPE) refers to linear non-branched chains of ethylene having molecular weights in excess of about 500,000, preferably above about 1,000,000, and more preferably above about 2,000,000. Often the molecular weights can reach about 8,000,000 or more. By initial average molecular weight is meant the average molecular weight of the UHMWPE starting material, prior to any irradiation. See U.S. Pat. No. 5,879,400, PCT/US99/16070, filed on Jul. 16, 1999, and PCT/US97/02220, filed Feb. 11, 1997.

The products and processes of this invention also apply to various types of polymeric materials, for example, any polyolefin, including high-density-polyethylene, low-densitypolyethylene, linear-low-density-polyethylene, ultra-high molecular weight polyethylene (UHMWPE), or mixtures thereof. Polymeric materials, as used herein, also applies to polyethylene of various forms, for example, resin powder, flakes, particles, powder, or a mixture thereof, or a consolidated form derived from any of the above.

Crosslinking Polymeric Material:

Polymeric Materials, for example, UHMWPE can be cross-linked by a variety of approaches, including those employing cross-linking chemicals (such as peroxides and/or silane) and/or irradiation. Preferred approaches for cross-linking employ irradiation. Cross-linked UHMWPE also can be obtained according to the teachings of U.S. Pat. No. 5,879,400, U.S. Pat. No. 6,641,617, and PCT/US97/02220.

Consolidated Polymeric Material:

Consolidated polymeric material refers to a solid, consolidated bar stock, solid material machined from stock, or semi-solid form of polymeric material derived from any forms as described herein, for example, resin powder, flakes, particles, or a mixture thereof, that can be consolidated. The consolidated polymeric material also can be in the form of a slab, block, solid bar stock, machined component, film, tube, balloon, pre-form, implant, or finished medical device.

The term "non-permanent device" refers to what is known in the art as a device that is intended for implantation in the body for a period of time shorter than several months. Some non-permanent devices could be in the body for a few seconds to several minutes, while other may be implanted for days, weeks, or up to several months. Non-permanent devices include catheters, tubing, intravenous tubing, and sutures, for example.

"Pharmaceutical compound", as described herein, refers to a drug in the form of a powder, suspension, emulsion, particle, film, cake, or molded form. The drug can be free-standing or incorporated as a component of a medical device.

The term "pressure chamber" refers to a vessel or a chamber in which the interior pressure can be raised to levels above atmospheric pressure.

The term "packaging" refers to the container or containers in which a medical device is packaged and/or shipped. Packaging can include several levels of materials, including bags, blister packs, heat-shrink packaging, boxes, ampoules, bottles, tubes, trays, or the like or a combination thereof. A single component may be shipped in several individual types of package, for example, the component can be placed in a bag, which in turn is placed in a tray, which in turn is placed in a box. The whole assembly can be sterilized and shipped. The packaging materials include, but not limited to, vegetable parchments, multi-layer polyethylene, Nylon 6, polyethylene terephthalate (PET), and polyvinyl chloride-vinyl acetate copolymer films, polypropylene, polystyrene, and ethylene-vinyl acetate (EVA) copolymers.

The term "sealing" refers to the process of isolating a chamber or a package from the outside atmosphere by closing an opening in the chamber or the package. Sealing can be accomplished by a variety of means, including application of heat (for example, thermally-sealing), use of adhesive, crimping, cold-molding, stapling, or application of pressure.

The term "blister packs" refers to a packaging comprised of a rigid plastic bowl with a lid or the like that is either peeled or punctured to remove the packaged contents. The lid is often made of aluminum, or a gas-permeable membrane such as a Tyvek. The blister packs are often blow-molded, a process where the plastic is heated above its deformation temperature, at which point pressurized gas forces the plastic into the required shape.

The term "heat-shrinkable packaging" refers to plastic films, bags, or tubes that have a high degree of orientation in them. Upon application of heat, the packaging shrinks down as the oriented chains retract, often wrapping tightly around the medical device.

The term "intervertebral disc system" refers to an artificial disc that separates the vertebrae in the spine. This system can either be composed of one type of material, or can be a composite structure, for example, cross-linked UHMWPE with metal edges.

The term "balloon catheters" refers to what is known in the art as a device used to expand the space inside blood vessels or similar. Balloon catheters are usually thin wall polymeric devices with an inflatable tip, and can expand blocked arteries, stents, or can be used to measure blood pressure. Commonly used polymeric balloons include, for example, polyether-block co-polyamide polymer (PeBAX®), Nylon, and polyethylene terephthalate (PET) balloons. Commonly used polymeric material used in the balloons and catheters include, for example, co-polymers of polyether and polyamide (for example, PeBAX®), Polyamides, Polyesters (for example, PET), and ethylene vinyl alcohol (EVA) used in catheter fabrication.

Medical Device Tubing:

Materials used in medical device tubing, including an intravenous tubing include, polyvinyl chloride (PVC), polyurethane, polyolefins, and blends or alloys such as thermoplastic elastomers, polyamide/imide, polyester, polycarbonate, or various fluoropolymers.

The term "stent" refers to what is known in the art as a metallic or polymeric cage-like device that is used to hold bodily vessels, such as blood vessels, open. Stents are usually introduced into the body in a collapsed state, and are inflated at the desired location in the body with a balloon catheter, where they remain.

"Melt transition temperature" refers to the lowest temperature at which all the crystalline domains in a material disappear.

Interface:

The term "interface" in this invention is defined as the niche in medical devices formed when an implant is in a configuration where a component is in contact with another piece (such as a metallic or a non-metallic component), which forms an interface between the polymer and the metal or another polymeric material. For example, interfaces of polymer-polymer or polymer-metal are in medical prosthesis, such as orthopedic joints and bone replacement parts, for example, hip, knee, elbow or ankle replacements.

Medical implants containing factory-assembled pieces that are in close contact with the polyethylene form interfaces. In most cases, the interfaces are not readily accessible to ethylene oxide gas or the gas plasma during a gas sterilization process.

Irradiation:

In one aspect of the invention, the type of radiation, preferably ionizing, is used. According to another aspect of the invention, a dose of ionizing radiation ranging from about 25 kGy to about 1000 kGy is used. The radiation dose can be about 25 kGy, about 50 kGy, about 65 kGy, about 75 kGy, about 100 kGy, about 150, kGy, about 200 kGy, about 300 kGy, about 400 kGy, about 500 kGy, about 600 kGy, about 700 kGy, about 800 kGy, about 900 kGy, or about 1000 kGy, or above 1000 kGy, or any integer or any fractional value thereabout or therebetween. Preferably, the radiation dose can be between about 25 kGy and about 150 kGy or between about 50 kGy and about 100 kGy. These types of radiation, including gamma and/or electron beam, kills or inactivates bacteria, viruses, or other microbial agents potentially contaminating medical implants, including the interfaces, thereby achieving product sterility. The irradiation, which may be electron or gamma irradiation, in accordance with the present invention can be carried out in air atmosphere containing oxygen, wherein the oxygen concentration in the atmosphere is at least 1%, 2%, 4%, or up to about 22%, or any integer or any fractional value thereabout or therebetween. In another aspect, the irradiation can be carried out in an inert atmosphere, wherein the atmosphere contains gas selected from the group consisting of nitrogen, argon, helium, neon, or the like, or a combination thereof. The irradiation also can be carried out in a vacuum.

In accordance with a preferred feature of this invention, the irradiation may be carried out in a sensitizing atmosphere. This may comprise a gaseous substance which is of sufficiently small molecular size to diffuse into the polymer and which, on irradiation, acts as a polyfunctional grafting moiety. Examples include substituted or unsubstituted polyunsaturated hydrocarbons; for example, acetylenic hydrocarbons such as acetylene; conjugated or unconjugated olefinic hydrocarbons such as butadiene and (meth)acrylate monomers; sulphur monochloride, with chloro-tri-fluoroethylene (CTFE) or acetylene being particularly preferred. By "gaseous" is meant herein that the sensitizing atmosphere is in the gas phase, either above or below its critical temperature, at the irradiation temperature.

Metal Piece:

In accordance with the invention, the piece forming an interface with polymeric material is, for example, a metal. The metal piece in functional relation with polyethylene, according to the present invention, can be made of a cobalt chrome alloy, stainless steel, titanium, titanium alloy or nickel cobalt alloy, for example.

Non-Metallic Piece:

In accordance with the invention, the piece forming an interface with polymeric material is, for example, a non-metal. The non-metal piece in functional relation with polyethylene, according to the present invention, can be made of ceramic material, for example.

Inert Atmosphere:

The term "inert atmosphere" refers to an environment having no more than 1% oxygen and more preferably, an oxidant-free condition that allows free radicals in polymeric materials to form cross links without oxidation during a process of sterilization. An inert atmosphere is used to avoid $O_2$, which would otherwise oxidize the medical device comprising a polymeric material, such as UHMWPE. Inert atmospheric conditions such as nitrogen, argon, helium, or neon are used for sterilizing polymeric medical implants by ionizing radiation.

Inert atmospheric conditions such as nitrogen, argon, helium, neon, or vacuum are also used for sterilizing interfaces of polymeric-metallic and/or polymeric-polymeric in medical implants by ionizing radiation.

Inert atmospheric conditions also refer to an inert gas, inert fluid, or inert liquid medium, such as nitrogen gas or silicon oil.

Anoxic Environment:

"Anoxic environment" refers to an environment containing gas, such as nitrogen, with less than 21%-22% oxygen, preferably with less than 2% oxygen. The oxygen concentration in an anoxic environment also can be at least 1%, 2%, 4%, 6%, 8%, 10%, 12% 14%, 16%, 18%, 20%, or up to about 22%, or any integer or any fractional value thereabout or therebetween.

Vacuum:

The term "vacuum" refers to an environment having no appreciable amount of gas, which otherwise would allow free radicals in polymeric materials to form cross links without oxidation during a process of sterilization. A vacuum is used to avoid $O_2$, which would otherwise oxidize the medical device comprising a polymeric material, such as UHMWPE. A vacuum condition can be used for sterilizing polymeric medical implants by ionizing radiation.

A vacuum condition can be created using a commercially available vacuum pump. A vacuum condition also can be used when sterilizing interfaces of polymeric-metallic and/or polymeric-polymeric in medical implants by ionizing radiation.

Residual Free Radicals:

"Residual free radicals" refers to free radicals that are generated when a polymer is exposed to ionizing radiation such as gamma or e-beam irradiation. While some of the free radicals recombine with each other to from crosslinks, some become trapped in crystalline domains. The trapped free radicals are also known as residual free radicals.

According to one aspect of the invention, the levels of residual free radicals in the polymer generated during an ionizing radiation (such as gamma or electron beam) is preferably determined using electron spin resonance and treated appropriately to reduce the free radicals.

Sterilization:

One aspect of the present invention discloses a process of sterilization of medical implants containing polymeric material, such as cross-linked UHMWPE. The process comprises sterilizing the medical implants by ionizing sterilization with gamma or electron beam radiation, for example, at a dose level ranging from 25-70 kGy, or by gas sterilization with ethylene oxide or gas plasma.

Another aspect of the present invention discloses a process of sterilization of medical implants containing polymeric material, such as cross-linked UHMWPE. The process comprises sterilizing the medical implants by ionizing sterilization with gamma or electron beam radiation, for example, at a dose level ranging from 25-200 kGy. The dose level of sterilization is higher than standard levels used in irradiation. This is to allow crosslinking or further crosslinking of the medical implants during sterilization.

In another aspect, the invention discloses a process of sterilizing medical implants containing polymeric material, such as cross-linked UHMWPE, that is in contact with another piece, including polymeric material consolidated by compression molding to another piece, thereby forming an interface and an interlocked hybrid material, comprising sterilizing an interface by ionizing radiation; heating the medium to above the melting point of the irradiated UHMWPE (above about 137° C.) to eliminate the crystalline matter and allow for the recombination/elimination of the residual free radicals; and sterilizing the medical implant with a gas, for example, ethylene oxide or gas plasma.

Heating:

One aspect of the present invention discloses a process of increasing the uniformity of the antioxidant following doping in polymeric component of a medical implant during the manufacturing process by heating for a time period depending on the melting temperature of the polymeric material. For example, the preferred temperature is about 137° C. or less. Another aspect of the invention discloses a heating step that can be carried in the air, in an atmosphere, containing oxygen, wherein the oxygen concentration is at least 1%, 2%, 4%, or up to about 22%, or any integer or any fractional value thereabout or therebetween. In another aspect, the invention discloses a heating step that can be carried while the implant is in contact with an inert atmosphere, wherein the inert atmosphere contains gas selected from the group consisting of nitrogen, argon, helium, neon, or the like, or a combination thereof. In another aspect, the invention discloses a heating step that can be carried while the implant is in contact with a non-oxidizing medium, such as an inert fluid medium, wherein the medium contains no more than about 1% oxygen. In another aspect, the invention discloses a heating step that can be carried while the implant is in a vacuum.

In another aspect of this invention, there is described the heating method of implants to reduce increase the uniformity of the antioxidant. The medical device comprising a polymeric raw material, such as UHMWPE, is generally heated to a temperature of about 137° C. or less following the step of doping with the antioxidant. The medical device is kept heated in the inert medium until the desired uniformity of the antioxidant is reached.

The term "below melting point" or "below the melt" refers to a temperature below the melting point of a polyethylene, for example, UHMWPE. The term "below melting point" or "below the melt" refers to a temperature less than 145° C., which may vary depending on the melting temperature of the polyethylene, for example, 145° C., 140° C. or 135° C., which again depends on the properties of the polyethylene being treated, for example, molecular weight averages and ranges, batch variations, etc. The melting temperature is typically measured using a differential scanning calorimeter (DSC) at a heating rate of 10° C. per minute. The peak melting temperature thus measured is referred to as melting point and occurs, for example, at approximately 137° C. for some grades of UHMWPE. It may be desirable to conduct a melting study on the starting polyethylene material in order to determine the melting temperature and to decide upon an irradiation and annealing temperature.

The term "annealing" refers to heating the polymer above or below its peak melting point. Annealing time can be at least 1 minute to several weeks long. In one aspect the annealing time is about 4 hours to about 48 hours, preferably 24 to 48 hours and more preferably about 24 hours. "Annealing temperature" refers to the thermal condition for annealing in accordance with the invention.

The term "annealing" also refers to annealing of additive-doped (such as antioxidant-doped) polymeric materials, including cross-linked and not cross-linked, consolidated or unconsolidated, solid blocks or machined, preform or finished polymeric materials, medical implants or fabricated articles, at a temperature below the melt in a supercritical fluid, for example, $CO_2$. Annealing can be carried out in a supercritical fluid at a temperature below the melt and under pressure, preferably above 200 psi, more preferably above about 1100 psi.

The term "contacted" includes physical proximity with or touching such that the sensitizing agent can perform its intended function. Preferably, a polyethylene composition or pre-form is sufficiently contacted such that it is soaked in the sensitizing agent, which ensures that the contact is sufficient. Soaking is defined as placing the sample in a specific environment for a sufficient period of time at an appropriate temperature, for example, soaking the sample in a solution of an antioxidant. The environment is heated to a temperature ranging from room temperature to a temperature below the melting point of the material. The contact period ranges from at least about 1 minute to several weeks and the duration depending on the temperature of the environment.

The term "non-oxidizing" refers to a state of polymeric material having an oxidation index (A. U.) of less than about 0.5 following aging polymeric materials for 5 weeks in air at 80° C. oven. Thus, a non-oxidizing cross-linked polymeric material generally shows an oxidation index (A. U.) of less than about 0.5 after the aging period.

Doping:

Doping refers to a process well known in the art (see, for example, U.S. Pat. Nos. 6,448,315 and 5,827,904). In this connection, doping generally refers to contacting a polymeric material with an antioxidant under certain conditions, as set forth herein, for example, doping UHMWPE with an additive such as an antioxidant under supercritical conditions.

More specifically, consolidated polymeric material can be doped with an additive by soaking the material in a solution of the additive. This allows the additive to diffuse into the polymer. For instance, the material can be soaked in 100% additive, such as 100% antioxidant. The material also can be soaked in an additive solution where a carrier solvent can be used to dilute the additive concentration. To increase the depth of diffusion of the additive, the material can be doped for longer durations, at higher temperatures, at higher pressures, and/or in presence of a supercritical fluid.

The doping process can involve soaking of a polymeric material, medical implant or device with an additive such as an antioxidant, for example, vitamin E, for about an hour up to several days, preferably for about one hour to 24 hours, more preferably for one hour to 16 hours. The antioxidant can be heated to room temperature or up to about 160° C. and the doping can be carried out at room temperature or up to about 160° C. Preferably, the antioxidant can be heated to 100° C. and the doping is carried out at 100° C.

The doping step can be followed by a heating step in air or in anoxic environment to improve the uniformity of the additive (such as antioxidant) within the polymeric material, medical implant or device. The heating may be carried out above or below or at the peak melting point.

According to one embodiment of the invention, the medical implant or device is cleaned before packaging and sterilization.

In another embodiment, the invention provides methods of making a medical implant comprising: blending polymeric material with an additive such as vitamin E; consolidating the polymer blend; annealing below or above the melt in a supercritical fluid; irradiating the polymer blend; thereby forming a cross-linked polymer blend; and machining the cross-linked blend; thereby forming an antioxidant-doped medical implant.

In another embodiment, the invention provides methods of making a medical implant comprising: blending polymeric material with an additive such as vitamin E; consolidating the polymer blend; irradiating the polymer blend; thereby forming a cross-linked polymer blend; annealing below or above the melt in a supercritical fluid; and machining the cross-linked blend; thereby forming a antioxidant-doped medical implant.

In another embodiment, the invention provides methods of making a medical implant comprising: providing a polymeric material; irradiating the consolidated polymeric material; thereby forming a cross-linked polymeric material; deforming the irradiated polymeric material below the melting temperature; doping the deformed irradiated polymeric material with an antioxidant; annealing the antioxidant-doped deformed irradiated polymeric material in a supercritical fluid(s) below or above the melting temperature; and machining the antioxidant-doped cross-linked polymeric material; thereby forming a antioxidant-doped cross-linked medical implant.

In another embodiment, the invention provides methods of making a medical implant comprising: providing a consolidated polymeric material; irradiating the consolidated polymeric material with ionizing radiation, thereby forming a consolidated and cross-linked polymeric material; machining the consolidated and cross-linked polymeric material, thereby forming a medical implant; doping the medical implant with an antioxidant by diffusion, thereby forming an antioxidant-doped cross-linked medical implant; and annealing the antioxidant-doped cross-linked medical implant at a temperature below or above the melt in a supercritical fluid; thereby forming an antioxidant-doped cross-linked homogenized medical implant.

In another embodiment, the invention provides methods of making a medical implant comprising: providing a consolidated polymeric material; irradiating the consolidated polymeric material with ionizing radiation, thereby forming a consolidated and cross-linked polymeric material; machining the consolidated and cross-linked polymeric material, thereby forming a perform; doping the perform with an antioxidant by diffusion, thereby forming an antioxidant-doped cross-linked medical implant; annealing the antioxidant-doped cross-linked medical implant at a temperature below or above the melt in a supercritical fluid; and machining the perform, thereby forming an antioxidant-doped cross-linked homogenized medical implant.

In another embodiment, the invention provides methods of making oxidation-resistant highly crystalline, cross-linked polymeric material by high pressure crystallization comprising: providing a consolidated polymeric material or a blend of polymeric material and antioxidant; irradiating the polymeric material or blend; pressurizing the irradiated polymeric material or blend under at least above 10-1000 MPa; heating the pressurized irradiated polymeric material or blend at a temperature below the melt of the pressurized irradiated polymeric material or blend; holding at this pressure and temperature; cooling the heated polymeric material to below the melting point of the polymer at ambient pressure or to about room temperature; releasing the pressure to an atmospheric pressure level; doping the highly crystalline polymeric material with an antioxidant by diffusion, thereby forming an antioxidant-doped highly crystalline, cross-linked polymeric material; and annealing the antioxidant-doped highly crystalline cross-linked polymeric material at a temperature below the melt in a supercritical fluid; thereby forming an antioxidant-doped homogenized cross-linked polymeric material.

In another embodiment, the invention provides methods of making oxidation-resistant highly crystalline, cross-linked polymeric material by high pressure crystallization comprising: providing a consolidated polymeric material or a blend of polymeric material and antioxidant; irradiating the polymeric material or blend; heating the irradiated polymeric material or blend to above the melting point; pressurizing the irradiated polymeric material or blend under at least above 10-1000 MPa; holding at this pressure and temperature; cooling the heated polymeric material to below the melting point of the polymer at ambient pressure or to about room temperature; releasing the pressure to an atmospheric pressure level; doping the highly crystalline polymeric material with an antioxidant by diffusion, thereby forming an antioxidant-doped highly crystalline, cross-linked polymeric material; and annealing the antioxidant-doped highly crystalline cross-linked polymeric material at a temperature below the melt in a supercritical fluid; thereby forming an antioxidant-doped homogenized cross-linked polymeric material.

High pressure crystallization is generally referred to as all of the methods of allowing the formation of extended chain crystals in the hexagonal phase. This transformation can be done by several different methods. The first is by heating to a temperature above the melting point of the polyethylene at ambient pressure, then pressurizing so that the sample is in the melt during the pressurization until the conditions are met for the melt-to-hexagonal phase transition to occur. Alternatively, stepwise heating and pressurization can be performed such that the sample is not always in the melt until close to the hexagonal phase. The sample heating and pressurization can be done in a variety of manners such that when the hexagonal phase transformation occurs, the UHMWPE does not have a substantial amount of preformed crystals and is considered in the melt phase.

Once the conditions are met for the hexagonal phase to be achieved and the extended chain crystals are formed, the sample cannot be allowed to completely melt because the desired crystalline structure would be lost. Therefore, any cooling and depressurization scheme allowing the sample to stay in the hexagonal or orthorhombic regions can be used. For example, a sample is high pressure crystallized at 200° C. and 380 MPa (55,000 psi) and cooled down to approximately below the melting point of polyethylene at room temperature (about 135-140° C.), then the pressure is released. Alternatively, a stepwise cooling and depressurization method can be used as long as the sample does not melt substantially.

The ratio of orthorhombic to hexagonal crystals may be dependent on the time spent in the hexagonal phase and whether or not the sample has melted during the cool down. If a sample is fully crystallized in the hexagonal phase, is cooled down and/or depressurized to a pressure such that it encounters the melt phase partially or completely, and solely decreasing the temperature at the new pressure would not cause the sample to be in the hexagonal phase then some or all of the crystals would be converted to orthorhombic crystals when the sample is further cooled down and depressurized.

In another embodiment, the invention provides UHMWPE incorporated with an additive by either doping by diffusion or by blending with powder and consolidation of the blend, wherein the UHMWPE is high pressure crystallized, and subsequently irradiated and annealed in a supercritical fluid(s). High pressure crystallization is carried out by heating to a temperature above the melting point of the irradiated or unirradiated UHMWPE at ambient pressure, pressurizing to at least about 10-1000 MPa, preferably at least about 150 MPa, more preferably at least about 250 MPa, heating to a temperature above the melting point, cooling to about room temperature and releasing the pressure. High pressure crystallization also can be carried out by pressurizing to at least about 10-1000 MPa, preferably at least about 150 MPa, more preferably at least about 250 MPa, heating to a temperature above the melting point of the irradiated or unirradiated UHMWPE at ambient pressure and below the melting point of the pressurized irradiated or unirradiated UHMWPE, cooling to about room temperature, and releasing the pressure.

According to one embodiment of the invention, a finished product is machined. According to another embodiment of the invention, the finished product is packaged and sterilized.

The invention is further described by the following examples, which do not limit the invention in any manner.

EXAMPLES

Example 1

Diffusion of Antioxidant into Polyethylene Subsequent to Irradiation (100 kGy) Followed by Homogenization in Supercritical Carbon Dioxide ($SC-CO_2$)

Test samples (2 cm cubes) were machined out of 100-kGy irradiated 2" rods of GUR 1050 UHMWPE. The samples were then doped with α-tocopherol at 120° C. for 2 hours in a 2-liter glass reaction flask under argon flow.

Following doping, excess α-tocopherol was wiped from the surface and the samples were subjected to one of four post-doping homogenization processes (n=3 each): (1) none, (2) 120° C. for 24 hrs, under nitrogen flow, (3) nitrogen at 1700 psi and 120° C. for 24 hrs, and (4) SC-$CO_2$ at 1700 psi and 120° C. for 24 hrs.

High pressure homogenization was performed in a one liter cell disruption vessel (HC4635, Parr Instruments, Moline, Ill.) stored in an air convection oven. Pressure was released after the vessel had cooled to room temperature.

For the SC-$CO_2$ experiments, liquid $CO_2$ (purity 99.97%, Airgas East, Hingham, Mass.) was pumped to the vessel during heating to 120° C. (Supercritical 24, Constant Pressure Dual Piston Pump, SSI/Lab Alliance) to a static pressure of 1700 psi, at which temperature and pressure it is in the supercritical phase.

Following doping and/or homogenization steps, the samples were analyzed with infra-red spectroscopy to determine the α-tocopherol profiles. Opposite faces of each 2 cm sample were removed to eliminate smearing during sectioning. The samples were then cut in half, perpendicular to the excised face, and sectioned (150 μm) using a microtome. Infrared spectra were collected by a BioRad UMA 500 microscope (Natick, Mass.) as a function of depth with an aperture size of 50×50 μm. The average surface α-tocopherol index (STI) was the average of the surface indices of three samples. The penetration depth was defined as a vitamin E index of 0.02.

The SC-$CO_2$ use increased the penetration depth of α-tocopherol in irradiated UHMWPE (see Table 1). The penetration depth at 120° C. and 1700 psi in supercritical $CO_2$ was almost twice of what was achieved with $N_2$ at the same temperature and pressure.

There was no significant effect of pressure on the depth of penetration of α-tocopherol when the homogenization pressure was increased from ambient to 1700 psi in $N_2$. The sample homogenized in $N_2$ at 1700 psi had a higher surface concentration than the one homogenized at ambient pressure.

In the SC-$CO_2$ samples, a drop in surface concentration was caused by a considerable increase in penetration (see FIG. 1 and Table 1). The increased penetration with SC-$CO_2$ is attributed to the ability of the solvent to swell the polymer.

The high concentration at the surface of irradiated UHMWPE after doping facilitates α-tocopherol diffusion into the sample during post-doping homogenization. This is due to a large chemical driving force created from the α-tocopherol-rich surface to the α-tocopherol-free bulk.

TABLE 1

Average α-tocopherol surface concentration and depth

| | STI | Depth of penetration (mm) |
|---|---|---|
| No homogenization | 0.96 | 0.77 |
| $N_2$/ambient pressure/120° C. | 0.22 | 2.73 |
| $N_2$/1700 psi/120° C. | 0.36 | 2.53 |
| SC—$CO_2$/1700 psi/120° C. | 0.12 | 4.25 |

Diffusion of α-tocopherol takes place in the amorphous portion of the polymer. Therefore, high temperature increases the mobility of the chains increasing diffusion.

SC-$CO_2$ also has been shown to dissolve α-tocopherol. Since the crystalline lamellae are impermeable to even small molecules such as oxygen, this swelling would take place almost exclusively in the amorphous phase, creating free volume for α-tocopherol diffusion. The combination of these factors caused the diffusion rate to improve.

Example 2

Diffusion of Antioxidant into Polyethylene Followed by Homogenization in Supercritical Carbon Dioxide Slab compression molded GUR1050 UHMWPE is used as stock material. Test samples (2 cm cubes) are machined out of this stock material. The samples are then doped with α-tocopherol at 120° C. for 2 hours in a 2-liter glass reaction flask under argon flow. Following doping, excess α-tocopherol is wiped from the surface and the samples are subjected supercritical $CO_2$ at 1700 psi and 120° C. for 24 hrs.

Example 3

Diffusion of Antioxidant into Polyethylene Followed by Homogenization in Supercritical Carbon Dioxide Followed by Irradiation Slab compression molded GUR1050 UHMWPE is used as stock material. Test samples (2 cm cubes) are machined out of this stock material. The samples are then doped with α-tocopherol at 120° C. for 2 hours in a 2-liter glass reaction flask under argon flow. Following doping, excess α-tocopherol is wiped from the surface and the samples are subjected supercritical $CO_2$ at 1700 psi and 120° C. for 24 hrs. Then these blocks are packaged in vacuum and irradiated to 25, 65, 100, 150 and 200 kGy by gamma irradiation.

Example 4

Measurement of Antioxidant Diffusion into Polyethylene

To measure the diffusion profile of the antioxidant in the test samples that were immersed in α-tocopherol (for example, see Examples 1-3), a cross-section was cut out of the immersed section (100-150 μm) using an LKB Sledge Microtome. The thin cross-section was then analyzed using a BioRad UMA 500 infrared microscope (Natick, Mass.). Infrared spectra were collected with an aperture size of 50×50 μm as a function of depth away from one of the edges that coincided with the free surface of the sample that contacted the antioxidant during immersion. The absorbance between 1226 and 1295 $cm^{-1}$ is characteristic of α-tocopherol and polyethylene does not absorb near these frequencies. For polyethylene, the 1895 $cm^{-1}$ wave number is a typical choice as an internal reference. The normalized value, which is the ratio of the integrated absorbances of 1260 $cm^{-1}$ and 1895 $cm^{-1}$, is an index that provides a relative metric of α-tocopherol composition in polyethylene.

Example 5

Vitamin E

Vitamin E (Acros™ 99% D-α-Tocopherol, Fisher Brand), was used in the experiments described herein, unless otherwise specified. The vitamin E used is very light yellow in color and is a viscous fluid at room temperature. Its melting point is 2-3° C.

Example 6

Gamma Irradiation of Polyethylene for Sterilization or Crosslinking

Cylindrical blocks (diameter 89 mm, length larger than 50 cm) were gamma irradiated using a $Co^{60}$ source (Steris Isomedix, Northborough, Mass.). A group of these blocks were vacuum packaged prior to irradiation and packaged blocks were irradiated. Another group of blocks were packaged and irradiated under nitrogen.

Example 7

Fabrication of a Highly Cross-Linked Medical Device

A tibial knee insert, for example, is machined from compression molded GUR1050 UHMWPE. The insert is then soaked in 100% vitamin E or a solution of vitamin E. The diffusion of vitamin E into the insert is accelerated by increasing temperature and/or pressure, which can be carried out either in air or inert or anoxic environment. Vitamin e-doped tibial knee insert is then annealed at a temperature below the melt in a supercritical fluid, for example $CO_2$, under high pressure, for example at above 1100 psi. After reaching desired level of vitamin E diffusion, the insert is packaged either in air or inert or anoxic environment. The packaged insert is then irradiated to 100 kGy dose. The irradiation serves two purposes: (1) crosslinks the polyethylene and improves wear resistance and (2) sterilizes the implant.

In this example the polyethylene implant can be any polyethylene medical device including those with abutting interfaces to other materials, such as metals. An example of this is non-modular, metal-backed, polyethylene components used in total joint arthroplasty.

Example 8

Sequences of Processing UHMWPE

UHMWPE can be doped with antioxidants at various stages, for example, as schematically shown in FIGS. 2 and 3. The methods further comprise a step of annealing in a supercritical fluid. For example, the antioxidant-doped cross-lined or not cross-cross-linked polymeric material at a temperature below the melt in a supercritical fluid, for example, super critical $CO_2$.

Example 9

Doping with Vitamin E and Annealing in Supercritical Carbon Dioxide of High Pressure Crystallized (First Melting, then Pressurizing) and Irradiated UHMWPE Ram extruded GUR1050 UHMWPE is used as stock. A 2" diameter cylinder is placed in the pressure chamber, where it is heated to 180° C. in water and held for 5 hours. Then, the pressure is increased to 310 MPa (45,000 psi) and the sample is held at this temperature and pressure for 5 hours. Finally, the sample is cooled to room temperature and the pressure is subsequently released. The bar is irradiated in vacuum to 100 kGy. Then it is doped in vitamin E at 120° C. under argon flow at ambient pressure for 24 hours. Subsequently, it is taken out of the vitamin E bath, cooled down to room temperature. The excess vitamin E from the surface is cleaned and the bar is placed in a pressure chamber, which is then filled with carbon dioxide pressurized to 1700 psi. The chamber is heated to 120° C. and kept at this pressure and temperature for 72 hours. The vessel is cooled to room temperature and the pressure is released.

Example 10

Doping with Vitamin E and Annealing in Supercritical Carbon Dioxide of High Pressure Crystallized (First Melting, then Pressurizing) UHMWPE Ram extruded GUR1050 UHMWPE is used as stock. A 2" diameter cylinder is placed in the pressure chamber, where it is heated to 180° C. in water and held for 5 hours. Then, the pressure is increased to 310 MPa (45,000 psi) and the sample is held at this temperature and pressure for 5 hours. Finally, the sample is cooled to room temperature and the pressure is subsequently released. Then it is doped in vitamin E at 120° C. under argon flow at ambient pressure for 24 hours. Subsequently, it is taken out of the vitamin E bath, cooled down to room temperature. The excess vitamin E from the surface is cleaned and the bar is placed in a pressure chamber, which is then filled with carbon dioxide pressurized to 1700 psi. The chamber is heated to 120° C. and kept at this pressure and temperature for 72 hours. The vessel is cooled to room temperature and the pressure is released. The highly crystalline UHMWPE vitamin E-doped and annealed bar is then irradiated in vacuum to 100 kGy.

Example 11

Doping with Vitamin E and Annealing in Supercritical Carbon Dioxide of High Pressure Crystallized (First Melting, then Pressurizing) and Irradiated UHMWPE Medical Implant Ram extruded GUR1050 UHMWPE is used as stock. A 2" diameter cylinder is placed in the pressure chamber, where it is heated to 180° C. in water and held for 5 hours. Then, the pressure is increased to 310 MPa (45,000 psi) and the sample is held at this temperature and pressure for 5 hours. Finally, the sample is cooled to room temperature and the pressure is subsequently released. The bar is machined into a medical implant. The medical implant is packaged and irradiated to 100 kGy. Then it is doped in vitamin E at 120° C. under argon flow at ambient pressure for 6 hours. Subsequently, it is taken out of the vitamin E bath, cooled down to room temperature. The excess vitamin E from the surface is cleaned and the bar is placed in a pressure chamber, which is then filled with carbon dioxide pressurized to 1700 psi. The chamber is heated to 120° C. and kept at this pressure and temperature for 24 hours. The vessel is cooled to room temperature and the pressure is released.

Example 12

Doping with Vitamin E and Annealing in Supercritical Carbon Dioxide of High Pressure Crystallized (First Melting, then Pressurizing) and Irradiated UHMWPE Ram extruded GUR1050 UHMWPE is used as stock. A 2" diameter cylinder is placed in the pressure chamber, where it is heated to 180° C. in water and held for 5 hours. Then, the pressure is increased to 310 MPa (45,000 psi) and the sample is held at this temperature and pressure for 5 hours. Finally, the sample is cooled to room temperature and the pressure is subsequently released. The bar is irradiated in vacuum to 100 kGy. A medical implant is machined from this high pressure crystallized and irradiated bar. Then it is doped in vitamin E at 120° C. under argon flow at ambient pressure for 6 hours. Subsequently, it is taken out of the vitamin E bath, cooled down to room temperature. The excess vitamin E from the surface is cleaned and the bar is placed in a pressure chamber, which is then filled with carbon dioxide pressurized to 1700 psi. The chamber is heated to 120° C. and kept at this pressure and temperature for 24 hours. The vessel is cooled to room temperature and the pressure is released.

Example 13

Doping with Vitamin E and Annealing in Supercritical Carbon Dioxide of High Pressure Crystallized (First Pressurizing, then Heating) and Irradiated UHMWPE Ram extruded GUR1050 UHMWPE is used as stock. A 2" diameter cylinder is placed in the pressure chamber, where the pressure is increased to 310 MPa (45,000 psi). The sample is then heated to 180° C. in water and held at this temperature and pressure for 5 hours. Finally, the sample is cooled to room temperature and the pressure is subsequently released. The bar is irradiated in vacuum to 100 kGy. Then it is doped in vitamin E at 120° C. under argon flow at ambient pressure for 24 hours. Subsequently, it is taken out of the vitamin E bath, cooled down to room temperature. The excess vitamin E from the surface is cleaned and the bar is placed in a pressure chamber, which is then filled with carbon dioxide pressurized to 1700 psi. The chamber is heated to 120° C. and kept at this pressure and temperature for 72 hours. The vessel is cooled to room temperature and the pressure is released.

Example 14

Doping with Vitamin E and Annealing in Supercritical Carbon Dioxide of High Pressure Crystallized (First Pressurizing, then Heating) UHMWPE Ram extruded GUR1050 UHMWPE is used as stock. A 2" diameter cylinder is placed in the pressure chamber, where the pressure is increased to 310 MPa (45,000 psi). The sample is then heated to 180° C. in water and held at this temperature and pressure for 5 hours. Finally, the sample is cooled to room temperature and the pressure is subsequently released. Then it is doped in vitamin E at 120° C. under argon flow at ambient pressure for 24 hours. Subsequently, it is taken out of the vitamin E bath, cooled down to room temperature. The excess vitamin E from the surface is cleaned and the bar is placed in a pressure chamber, which is then filled with carbon dioxide pressurized to 1700 psi. The chamber is heated to 120° C. and kept at this pressure and temperature for 72 hours. The vessel is cooled to room temperature and the pressure is released. The highly crystalline UHMWPE vitamin E-doped and annealed bar is then irradiated in vacuum to 100 kGy.

Example 15

Doping with Vitamin E and Annealing in Supercritical Carbon Dioxide of High Pressure Crystallized (First Pressurizing, then Heating) and Irradiated UHMWPE Medical Implant Ram extruded GUR1050 UHMWPE is used as stock. A 2" diameter cylinder is placed in the pressure chamber, where the pressure is increased to 310 MPa (45,000 psi). The sample is then heated to 180° C. in water and held at this temperature and pressure for 5 hours. Finally, the sample is cooled to room temperature and the pressure is subsequently released. The bar is machined into a medical implant. The medical implant is packaged and irradiated to 100 kGy. Then it is doped in vitamin E at 120° C. under argon flow at ambient pressure for 6 hours. Subsequently, it is taken out of the vitamin E bath, cooled down to room temperature. The excess vitamin E from the surface is cleaned and the bar is placed in a pressure chamber, which is then filled with carbon dioxide pressurized to 1700 psi. The chamber is heated to 120° C. and kept at this pressure and temperature for 24 hours. The vessel is cooled to room temperature and the pressure is released.

Example 16

Doping with Vitamin E and Annealing in Supercritical Carbon Dioxide of High Pressure Crystallized (First Pressurizing, then Heating) and Irradiated UHMWPE Ram extruded GUR1050 UHMWPE is used as stock. A 2" diameter cylinder is placed in the pressure chamber, where the pressure is increased to 310 MPa (45,000 psi). The sample is then heated to 180° C. in water and held at this temperature and pressure for 5 hours. Finally, the sample is cooled to room temperature and the pressure is subsequently released. The bar is irradiated in vacuum to 100 kGy. A medical implant is machined from this high pressure crystallized and irradiated bar. Then it is doped in vitamin E at 120° C. under argon flow at ambient pressure for 6 hours. Subsequently, it is taken out of the vitamin E bath, cooled down to room temperature. The excess vitamin E from the surface is cleaned and the bar is placed in a pressure chamber, which is then filled with carbon dioxide pressurized to 1700 psi. The chamber is heated to 120° C. and kept at this pressure and temperature for 24 hours. The vessel is cooled to room temperature and the pressure is released.

Example 17

Doping with Vitamin E and Annealing in Supercritical Carbon Dioxide of UHMWPE Prior to High Pressure Crystallized (First Pressurizing, then Heating)

Ram extruded GUR1050 UHMWPE is used as stock. A 2" bar is doped in vitamin E at 120° C. under argon flow at ambient pressure for 24 hours. Subsequently, it is taken out of the vitamin E bath, cooled down to room temperature. The excess vitamin E from the surface is cleaned and the bar is placed in a pressure chamber, which is then filled with carbon dioxide pressurized to 1700 psi. The chamber is heated to 120° C. and kept at this pressure and temperature for 72 hours. The vessel is cooled to room temperature and the pressure is released. Then the 2" diameter cylinder is placed in the pressure chamber, where the pressure is increased to 310 MPa (45,000 psi). The sample is then heated to 180° C. in water and held at this temperature and pressure for 5 hours. Finally, the sample is cooled to room temperature and the pressure is subsequently released. It is then packaged and irradiated.

Example 18

Doping with Vitamin E and Annealing in Supercritical Carbon Dioxide of High Pressure Crystallized (First Melting, then Pressurizing) and Irradiated UHMWPE Ram extruded GUR1050 UHMWPE is used as stock. A 2" diameter cylinder is doped in vitamin E at 120° C. under argon flow at ambient pressure for 24 hours. Subsequently, it is taken out of the vitamin E bath, cooled down to room temperature. The excess vitamin E from the surface is cleaned and the bar is placed in a pressure chamber, which is then filled with carbon dioxide pressurized to 1700 psi. The chamber is heated to 120° C. and kept at this pressure and temperature for 72 hours. The vessel is cooled to room temperature and the pressure is released. Then it is placed in a pressure chamber, where it is heated to 180° C. in water and held for 5 hours. Then, the pressure is increased to 310 MPa (45,000 psi) and the sample is held at this temperature and pressure for 5 hours. Finally, the sample is cooled to room temperature and the pressure is subsequently released. It is then packaged and irradiated.

Example 19

The Effect of Annealing (Homogenization) Temperature of Supercritical Carbon Dioxide on the Penetration Depth of Vitamin E in Irradiated UHMWPE Slab compression molded GUR1050 UHMWPE was irradiated to 100-kGy by e-beam irradiation. Cubes (2 cm cubes) were machined from the irradiated stock. These cubes were doped in pure vitamin E (D,L-α-tocopherol, DSM Nutritional Products, XX, NJ) at 120° C. for 2 hours under argon flow. Subsequently, they were cooled down to about room temperature to 60° C. and the excess vitamin E on the surface was wiped off with a cotton gauze pad. Then, the samples were placed in a pressure bomb ((HC4635, Parr Instruments, Moline, Ill.) and placed in an air convection oven and connected to a liquid carbon dioxide tank. The pressure bomb was purged with carbon dioxide, then closed off. The carbon dioxide was pumped (Supercritical 24, Constant Pressure Dual Piston Pump, SSI/Lab Alliance) to 1500 psi as the bomb heated to the desired temperature. If the pressure exceeded 1500 psi, then about 100-200 psi of carbon dioxide was vented off until equilibrium temperature and pressure was reached. The experiment was performed with three cubes each at 90, 110, 120 and 130° C. After the respective temperature and 1500 psi were reached, the samples were kept at temperature and pressure for 24 hours. Then, the bomb was cooled down to about room temperature and then depressurized.

Figure 4:
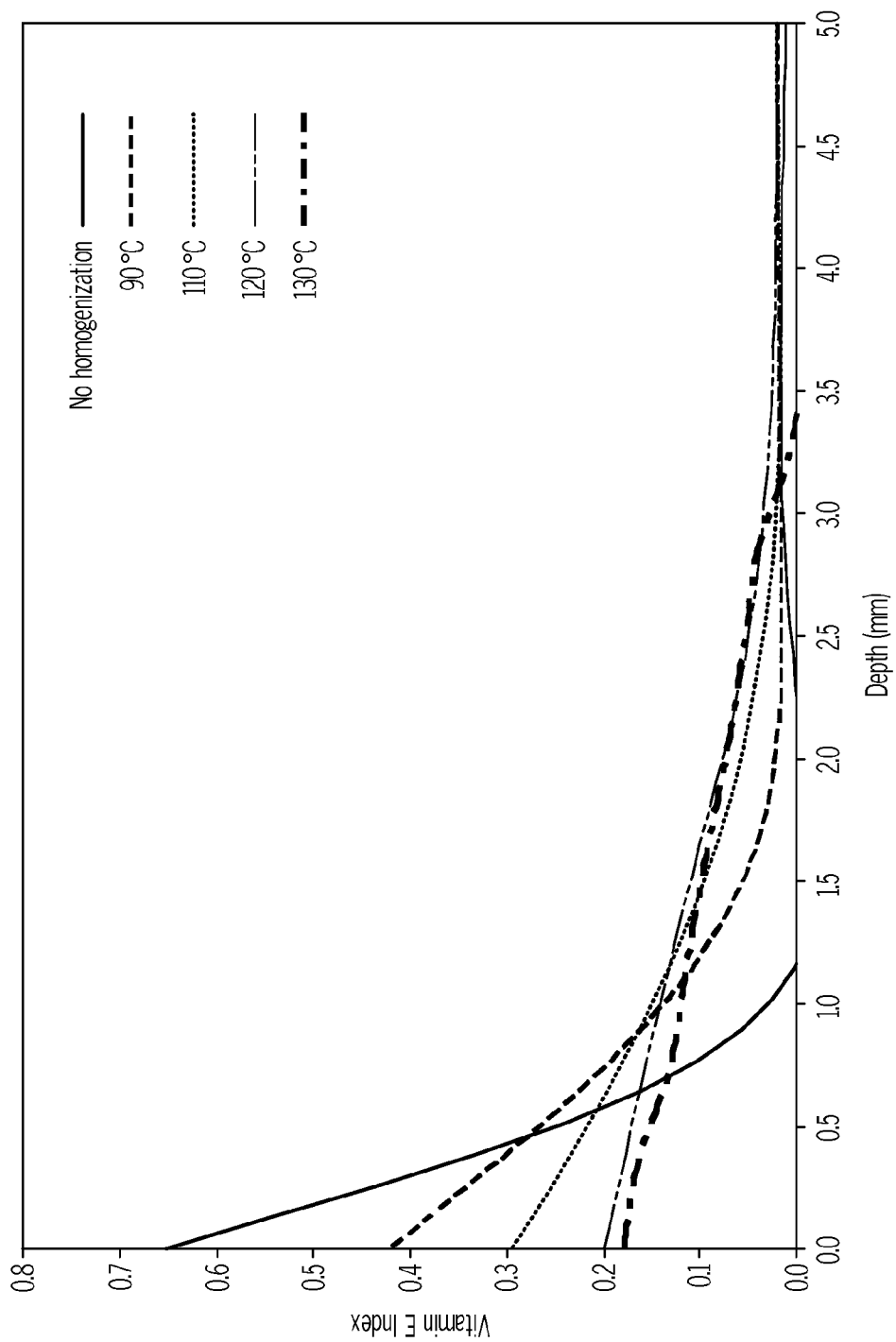
FIG. 4 shows the vitamin E concentration profiles of 100-kGy irradiated UHMWPE doped with vitamin E at 120° C. at ambient pressure under argon flow, followed by no homogenization; or homogenization for 24 hours in supercritical carbon dioxide at 1500 psi at 90, 110, 120 and 130° C.
Figure 5:
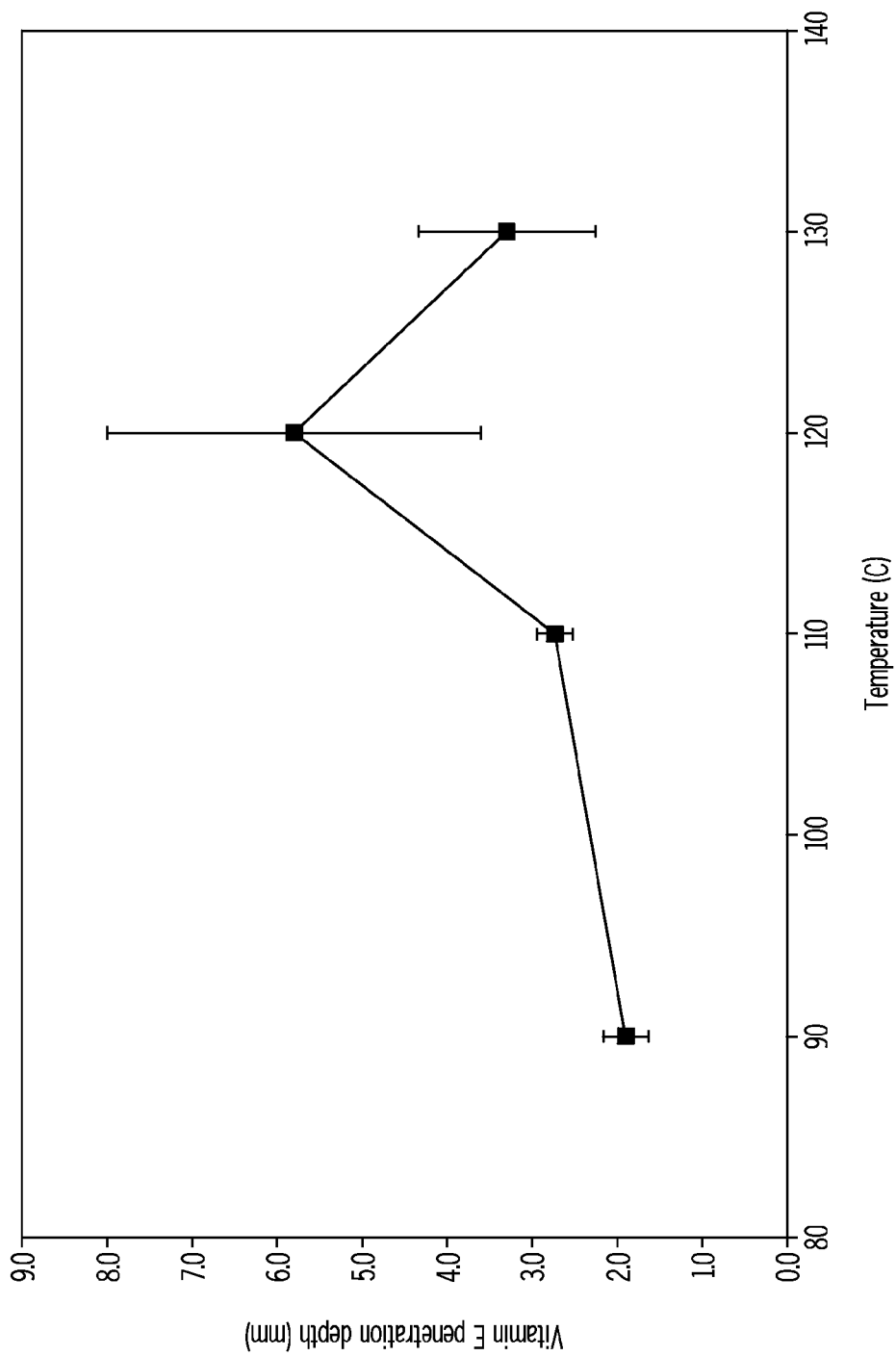
FIG. 5 shows the vitamin E penetration depth for 100-kGy irradiated UHMWPE doped at 120° C. for 2 hours under an ambient pressure and annealed (homogenized) at 90, 110, 120 or 130° C. for 24 hours in supercritical carbon dioxide at 1500 psi as a function of the annealing temperature.

The vitamin E concentration profiles of these samples were determined by using FTIR spectroscopy as described in Example 1. FIG. 4 shows the vitamin E concentration profiles from the surface of these 100-kGy irradiated, vitamin E-doped and supercritical carbon dioxide-annealed UHMWPE cubes. The penetration improved with increasing annealing temperature until 120° C. (FIG. 4). Annealing at 130° C. did not improve penetration over that obtained for annealing at 120° C. (FIG. 5).

It is to be understood that the description, specific examples and data, while indicating exemplary embodiments, are given by way of illustration and are not intended to limit the present invention. Various changes and modifications within the present invention will become apparent to the skilled artisan from the discussion, disclosure and data contained herein, and thus are considered part of the invention.

The invention claimed is:

1. A method of making an antioxidant-doped homogenized cross-linked consolidated interlocked hybrid polymeric material comprising the steps of:
   a) providing a polymeric material in a powder form;
   b) doping the polymeric material with an antioxidant without using a supercritical fluid, thereby forming an antioxidant-doped polymeric material;
   c) annealing the antioxidant-doped polymeric material from step b) in a supercritical fluid, thereby forming an antioxidant-doped homogenized polymeric material;
   d) heating and pressurizing the heated antioxidant-doped homogenized polymeric material under 10-1000 MPa to a counterface of a second material, thereby forming a hybrid material having an interface between the polymeric material and the second material;
   e) holding at the pressure and temperature;
   f) cooling the heated polymeric material;
   g) releasing the pressure, thereby forming an antioxidant-doped homogenized interlocked hybrid material; and
   h) irradiating the antioxidant-doped homogenized hybrid material by ionizing radiation, thereby forming an antioxidant-doped homogenized cross-linked interlocked hybrid material.

2. The method according to claim 1, wherein the annealing is carried out above 30° C. and above 200 psi.

3. The method according to claim 1, wherein the annealing is carried out at about 120° C. and at about 1700 psi.

4. The method according to claim 1, wherein the annealing is carried out at above 120° C. and above 1700 psi.

5. The method according to claim 1, wherein the polymeric material is irradiated at a temperature between about room temperature and about 90° C.

6. The method according to claim 1, wherein the polymeric material is irradiated at a temperature between about 90° C. and the peak melting point of the polymeric material.

7. The method according to claim 1, wherein the doping is carried out by soaking the polymeric material in the antioxidant for about an hour or about 16 hours.

8. The method according to claim 1, wherein the antioxidant is heated to a temperature between the room temperature and about 100° C. and the doping is carried out at a temperature between the room temperature and about 100° C.

9. The method according to claim 1, wherein the polymeric material is selected from a group consisting of a low-density polyethylene, high-density polyethylene, linear low-density polyethylene, ultra-high molecular weight polyethylene (UHMWPE), and a mixture thereof.

10. The method according to claim 1, wherein the polymeric material is polymeric resin powder, polymeric flakes, polymeric particles, or a mixture thereof.

11. The method according to claim 1, wherein the irradiation is carried out in air or inert gaseous atmosphere containing between about 1% and about 22% oxygen.

12. The method according to claim 1, wherein the irradiation is carried out in an inert atmosphere, wherein the inert atmosphere contains gas selected from the group consisting of nitrogen, argon, helium, neon, or a combination thereof.

13. The method according to claim 1, wherein the radiation dose is between about 25 and about 1000 kGy.

14. The method according to claim 1, wherein the radiation dose is about 65 kGy, about 75 kGy, or about 100 kGy.

15. The method according to claim 1, wherein the radiation is a gamma or an electron beam irradiation.

16. The method according to claim 1, wherein the polymeric material is soaked in a solution of the antioxidant in ethanol.

17. The method according to claim 1, wherein the supercritical fluid is $CO_2$.

18. The method according to claim 1, wherein the antioxidant is vitamin E.

19. The method according to claim 1, wherein the polymeric material at step (a) is a blend of a polymeric material and an antioxidant.

* * * * *